United States Patent
Taguchi et al.

(10) Patent No.: US 6,258,290 B1
(45) Date of Patent: *Jul. 10, 2001

(54) MAGNET POWDER, SINTERED MAGNET, PROCESS FOR PRODUCING THEM, BONDED MAGNET, MOTOR AND MAGNETIC RECORDING MEDIUM

(75) Inventors: Hitoshi Taguchi; Kiyoyuki Masuzawa, both of Chiba; Yoshihiko Minachi, Shizuoka; Kazumasa Iida, Chiba; Mitsuaki Sasaki, Shizuoka; Fumihiko Hirata, Aichi, all of (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/593,008

(22) Filed: Jun. 13, 2000

Related U.S. Application Data

(63) Continuation of application No. 09/314,013, filed on May 19, 1999, now Pat. No. 6,086,781, which is a continuation of application No. PCT/JP98/04243, filed on Sep. 21, 1998.

(30) Foreign Application Priority Data

Sep. 19, 1997 (JP) .................................................... 9-273936

(51) Int. Cl.⁷ .................................................. C04B 35/40
(52) U.S. Cl. .................................... 252/62.59; 252/62.57; 252/62.63
(58) Field of Search ............................. 252/62.57, 62.59, 252/62.63; 244/611, 612

(56) References Cited

U.S. PATENT DOCUMENTS

| | | | |
|---|---|---|---|
| 4,636,433 | 1/1987 | Kubo et al. | 428/328 |
| 5,607,615 | 3/1997 | Taguchi et al. | 252/62.63 |
| 5,648,039 | 7/1997 | Taguchi et al. | 264/428 |
| 5,811,024 | 9/1998 | Taguchi et al. | 252/62.63 |
| 5,846,449 | 12/1998 | Taguchi et al. | 252/62.62 |
| 5,945,028 | 8/1999 | Taguchi et al. | . |
| 5,951,937 | 9/1999 | Taguchi et al. | 264/427 |
| 5,958,284 | 9/1999 | Takami et al. | 252/62.63 |
| 6,086,781 * | 7/2000 | Taguchi et al. | 252/62.57 |

FOREIGN PATENT DOCUMENTS

| | | |
|---|---|---|
| 0 609 071 | 8/1994 | (EP) . |
| 60-063715 | 4/1985 | (JP) . |
| 62-119760 | 6/1987 | (JP) . |

OTHER PUBLICATIONS

Smolenskii, G.A., et al., "Investigation of Ferrimagnets with the Structure of Magnetoplumbite and Garnet in Strong Pulse Magnetic Fields," *Bull. Acad. Sci. USSR Phys. Ser.*, vol. 25, pp. 1405–1408 (1961).

Mulay V.N., et al., "Synthesis & Properties of Some New Ferrites of Formula $La^{3+}Me^{2+}Fe_{11}^{3+}O_{19}^{=}$," *Indian Journ. Of Pure and Appl. Phys.*, vol. 8, pp. 412–415, (1970).

* cited by examiner

Primary Examiner—C. Melissa Koslow
(74) Attorney, Agent, or Firm—Oblon, Spivak, McClelland, Maier & Neustadt, P.C.

(57) ABSTRACT

The magnetic powder and the sintered magnet of the invention contains a primary phase of a hexagonal ferrite containing A, Co or R wherein A represents Sr, Ba or Ca, and R represents at least one element which may be rare earth elements including Y, and Bi, and have at least two different Curie temperatures. wherein the two different Curie temperatures are present within a range of from 400 to 480° C., and an absolute value of a difference therebetween is 5° C. or more. As both the saturation magnetization and the magnetic anisotropy of the M type ferrite therein are increased, the magnetic powder and the wintered magnet have a high residual magnetic flux density and a high coercive force, which conventional M type ferrite magnets could not have, while having excellent temperature characteristics of coercive force.

20 Claims, 20 Drawing Sheets

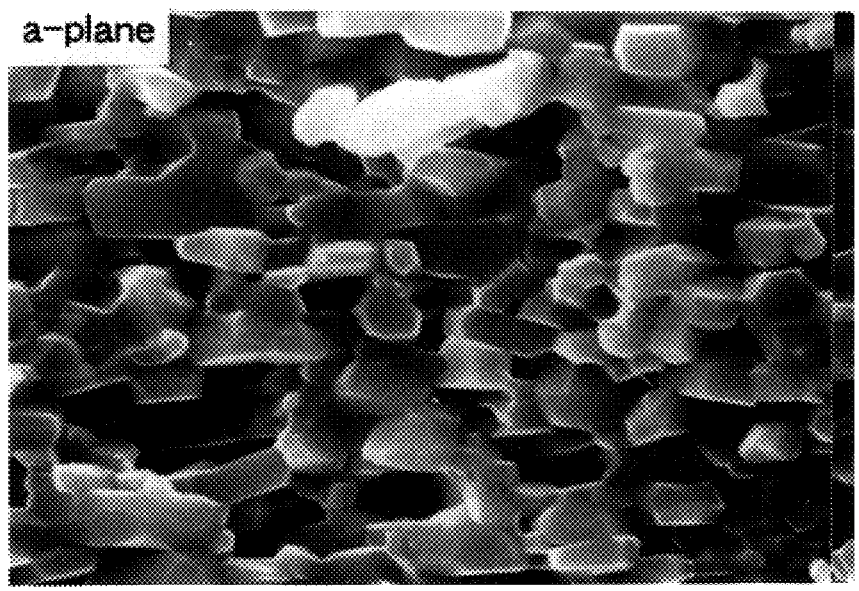
FIG. 1   1 μm
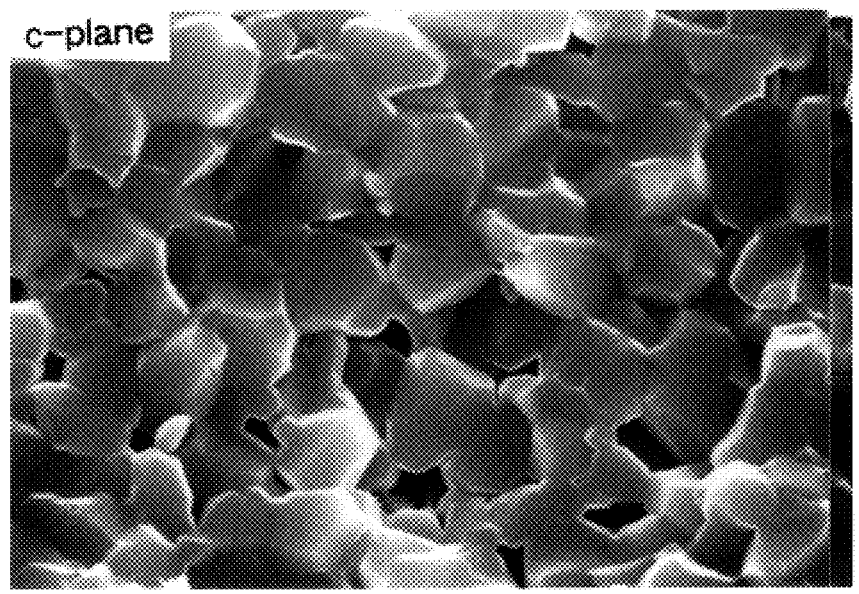
FIG. 2   1 μm

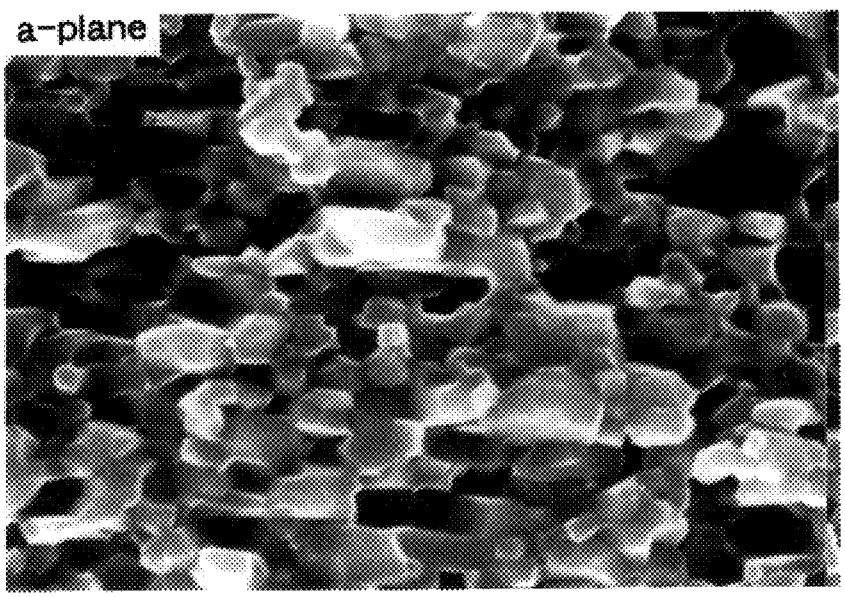
FIG. 3  —— 1 μm
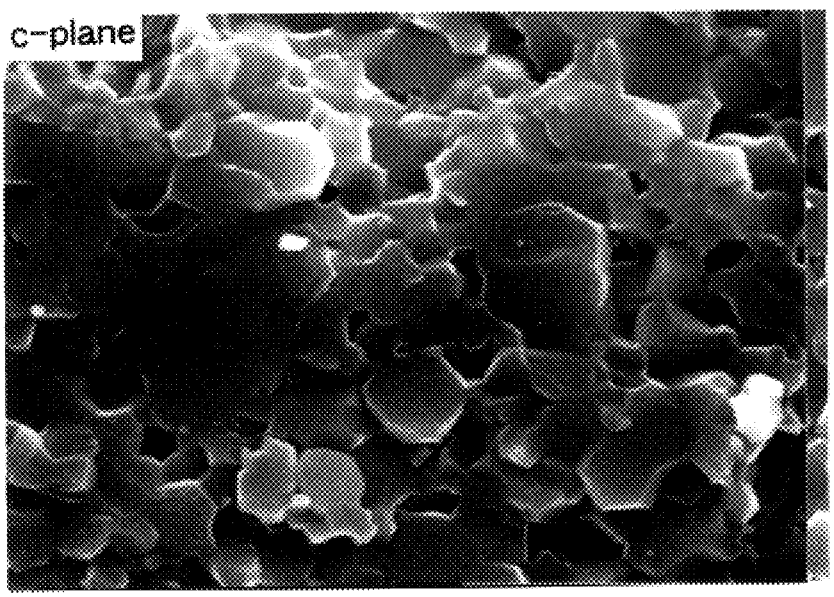
FIG. 4  —— 1 μm

Tc (CURIE TEMPERATURE) OF LaCo-SUBSTITUTED $Sr_{1-x}La_xFe_{12-x}Co_xO_{19}$ WITH THE DEGREE OF SUBSTITUTION x VARIED

HcJ ($T_2$ = 1200°C) OF LaCo-SUBSTITUTED $Sr_{1-x}La_xFe_{12-x}Co_xO_{19}$ WITH THE DEGREE OF SUBSTITUTION x VARIED

Hk/HcJ ($T_2$ = 1200°C) OF LaCo-SUBSTITUTED $Sr_{1-x}La_xFe_{12-x}Co_xO_{19}$ WITH THE DEGREE OF SUBSTITUTION x VARIED

BEFORE: SAMPLES AS PRODUCED IN THE SOLVENT SYSTEM WITH THE ADDITIVE COMPOUNDS ADDED BEFORE THE CALCINATION
AFTER: SAMPLES AS PRODUCED IN THE AQUEOUS SYSTEM WITH THE ADDITIVE COMPOUNDS ADDED AFTER THE CALCINATION

Ha (ANISOTROPIC MAGNETIC FIELD) OF LaCo-SUBSTITUTED $Sr_{1-x}La_xFe_{12-x}Co_xO_{19}$ $Sr_{1-x}La_xFe_{12-x}Co_xO_{19}$

FIG. 20

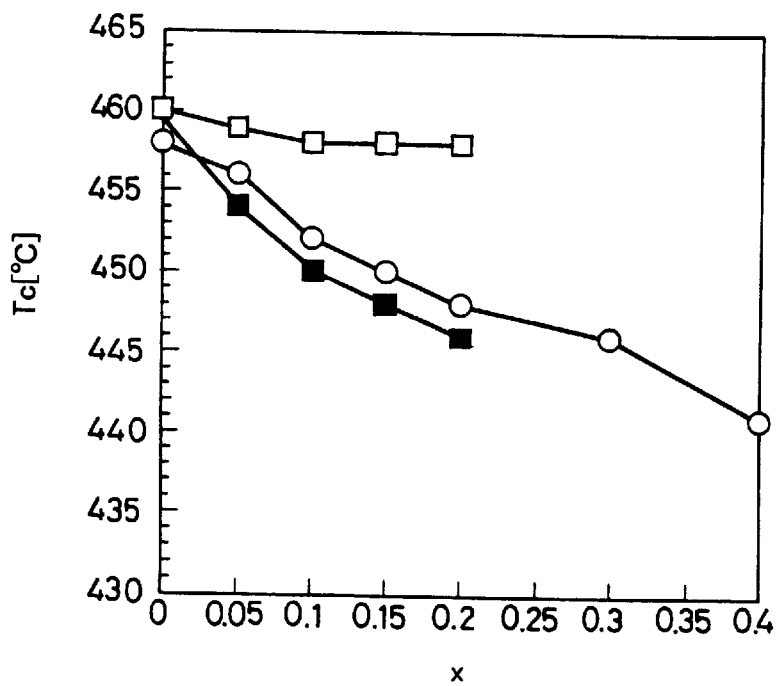

— ■ — Tc1 OF THE SAMPLES AS PRODUCED IN THE AQUEOUS SYSTEM WITH THE ADDITIVE COMPOUNDS ADDED AFTER THE CALCINATION
— □ — Tc2 OF THE SAMPLES AS PRODUCED IN THE AQUEOUS SYSTEM WITH THE ADDITIVE COMPOUNDS ADDED AFTER THE CALCINATION
— ○ — Tc OF THE SAMPLES AS PRODUCED IN THE SOLVENT SYSTEM WITH THE ADDITIVE COMPOUNDS ADDED BEFORE THE CALCINATION

Tc (CURIE TEMPERATURE) OF PrCo-SUBSTITUTED $Sr_{1-x}Pr_xFe_{12-x}Co_xO_{19}$ WITH THE DEGREE OF SUBSTITUTION x VARIED

—■— SAMPLES AS PRODUCED IN THE AQUEOUS SYSTEM WITH THE ADDITIVE COMPOUNDS ADDED AFTER THE CALCINATION
—○— SAMPLES AS PRODUCED IN THE SOLVENT SYSTEM WITH THE ADDITIVE COMPOUNDS ADDED BEFORE THE CALCINATION

HcJ ($T_2$ = 1200°C) OF PrCo-SUBSTITUTED $Sr_{1-x}Pr_xFe_{12-x}Co_xO_{19}$

MAGNET POWDER, SINTERED MAGNET, PROCESS FOR PRODUCING THEM, BONDED MAGNET, MOTOR AND MAGNETIC RECORDING MEDIUM

This application is a continuation of Ser. No. 09/314,013 May 19, 1999 U.S. Pat. No. 6,086,781 which is a continuation of PCT/JP98/04243 Sep. 21, 1998.

BACKGROUND OF THE INVENTION

1. Field of the Invention

The present invention relates to a hexagonal ferrite suitably used as a permanent magnet material, such as a motor for an automobile, and particularly relates to a magnet material containing a hexagonal magnetoplumbite ferrite, and a process for producing the same.

2. Description of the Background

As an oxide permanent magnet material, a strontium (Sr) ferrite and a barium (Ba) ferrite, which are of a magnetoplumbite (M type) hexagonal structure, are mainly used, and they are produced as a sintered magnet and a bonded magnet.

Among the various characteristics of a magnet, residual magnetic flux density (Br) and intrinsic coercive force (HcJ) are particularly important.

Br is determined by the density of the magnet, the degree of orientation of the magnet, and the saturation magnetization ($4\pi Is$) determined by the crystal structure.

Br is expressed by the following equation:

$$Br = 4\pi Is \times (\text{degree of orientation}) \times (\text{density})$$

The Sr ferrite and the Ba ferrite of M type has a $4\pi Is$ value of about 4.65 kG. The density and the degree of orientation each is about 98% at most in the sintered magnet, which provides the highest values. Therefore, Br of these magnets is limited to about 4.46 kG at most, and it has been practically impossible to provide a high Br value of 4.5 kG or more.

The present inventors previously discovered that the addition of appropriate amounts of La and Zn in an M type ferrite raises the $4\pi Is$ value thereof by about 200 G at most, and a Br value of 4.5 kG or more can be obtained, as described in U.S. patent application Ser. No. 08/672,848. In this case, however, since the anisotropic magnetic field ($H_A$), which will be described herein below, is decreased, it is difficult to obtain a Br value of 4.5 kG or more and an HcJ of 3.5 kOe or more at the same time.

HcJ is in proportion to the product ($H_A \times fc$) of the anisotropic magnetic field ($H_A$ (=$2K_1/Is$)) and a single magnetic domain grain fraction (fc), in which $K_1$ represents a crystal magnetic anisotropy constant, which is determined by the crystal structure as similar to Is. The M type Ba ferrite has $K_1$ of $3.3 \times 10^6$ erg/cm$^3$, and the M type Sr ferrite has $K_1$ of $3.5 \times 10^6$ erg/cm$^3$. It has been known that the M type Sr ferrite has the largest $K_1$ value, but it has been difficult to further raise the $K_1$ value.

On the other hand, in the case where ferrite particles are in a single magnetic domain condition, the maximum HcJ is expected because the magnetization must be rotated against the anisotropic magnetic field to reverse the magnetization. In order to make ferrite grains into single magnetic domain grains, the size of the ferrite particles must be smaller than the following critical diameter (dc) as expressed by the following equation:

$$dc = 2(k \cdot Tc \cdot K_1/a)^{1/2}/Is^2$$

wherein k represents the Boltzman constant, Tc represents a Curie temperature, and a represents a distance between iron ions. For M type Sr ferrite, since dc is about 1 µm, in is order to produce a sintered magnet it is necessary that the crystal grain size of the sintered magnet be controlled to 1 µm or less. While it has been difficult to realize such a fine crystal grain and the high density and the high degree of orientation to provide a high Br at the same time, the present inventors previously proposed a new production process to demonstrate that superior characteristics that cannot be found in the art are obtained, as described in Japanese Patent Application Kokai No. 653064. In this process, however, the HcJ value becomes 4.0 kOe when the Br value is 4.4 kG, and therefore it has remained difficult to obtain a high HcJ of 4.5 kOe or more with maintaining a high Br of 4.4 kG or more at the same time.

In order to control crystal grain size of a sintered body to 1 µm or less, it is necessary to make the powder size in the molding step 0.5 µm or less considering the growth of the grains in the sintering step. The use of such fine particles causes a decrease in productivity due to increased molding time and increased crack generation on molding. Thus, it has remained difficult to realize high characteristics and high productivity at the same time.

It is known that the addition of $Al_2O_3$ and $Cr_2O_3$ is effective to obtain a high HcJ value. Notably, $Al^{3+}$ and $Cr^{3+}$ lead to an increased $H_A$ and suppress the grain growth by substituting for $Fe^{3+}$ having an upward spin in the M type structure, so that a high HcJ value of 4.5 kOe or more is obtained. However, when the Is value is reduced, the Br value is considerably reduced since the sintered density is reduced. As a result, the composition exhibiting a maximum HcJ of 4.5 kOe can only provide a Br value of 4.2 kG.

A sintered magnet of the conventional anisotropic M type ferrite has a temperature dependency of HcJ of about +13 Oe/° C. and a relatively high temperature coefficient of about from +0.3 to +0.5%/° C., which sometimes bring about great reduction in HcJ on the low temperature side and thus demagnetization. In order to prevent such demagnetization, the HcJ value at room temperature must be a large value of about 5 kOe, and therefore it is substantially impossible to obtain a high Br value at the same time. Powder of an isotropic M type ferrite has a temperature dependency of HcJ of at least about +8 Oe/° C., although it is superior to the anisotropic sintered magnet, and a temperature coefficient of +0.15%/° C. Thus, it has remained difficult to further improve the temperature characteristics. A ferrite magnet is excellent in environmental resistance and is not expensive, hence, it is frequently used in a motor in various parts of an automobile. Since an automobile may be used under severe conditions including intense cold and heat, the motor is required to stably function under such severe conditions. However, a conventional ferrite magnet exhibits considerable deterioration in coercive force under low temperature conditions, as described above.

Even though ferrite magnets afford such characteristics, ferrite magnets having low squareness (Hk/HcJ) in the demagnetration curve exhibit low (BH)max and a deteriorated change with time.

Thus, a need exists for a magnet having a high degree of orientation, which is obtained by a production process using an aqueous solvent. This would afford advantages in productivity, and moreover, would not cause environmental contamination, as when organic solvents are used, whereby use of equipment for preventing contamination could be avoided.

SUMMARY OF THE INVENTION

Accordingly, it is an object of the present invention to provide a ferrite magnet and a process for producing the same, which magnet has a high residual magnetic flux density and a high coercive force that cannot be attained by the conventional M type ferrite magnet, and which is also excellent in temperature characteristics of coercive force, has excellent magnetic characteristics in that decreasing coercive force does not occur, particularly, in a low temperature region, and which is excellent in squareness in the demagnetization curve.

It is yet another object of the present invention to provide a ferrite magnet and a process for producing the same, which exhibits superior characteristics even though the content of expensive Co is reduced.

It is, moreover, yet another object of the present invention to provide a ferrite magnet and a process for producing the same, which exhibits a high degree of orientation even though it is produced by a production process using an aqueous system.

A still further object of the present invention is to provide a motor and a magnetic recording medium having excellent characteristics.

The above objects and others are provided by a magnet powder containing a primary phase of a hexagonal ferrite containing A, Co and R, wherein A is Sr, Ba or Ca; and R is at least one element selected from the group consisting of rare earth elements, wherein the magnet powder has at least two different Curie temperatures, the two different Curie temperatures are present within a range of from 400 to 480° C., and an absolute value of a difference therebetween is 5° C. or more.

BRIEF DESCRIPTION OF THE DRAWINGS

FIG. 1 is an SEM photograph of the structure of the a-plane of the sintered magnet Sample No. 1 of the invention.

FIG. 2 is an SEM photograph of the structure of the c-plane of the sintered magnet Sample No. 1 of the invention.

FIG. 3 is an SEM photograph of the structure of the a-plane of the Comparative Sample No. 3.

FIG. 4 is an SEM photograph of the structure of the c-plane of the Comparative Sample No. 3.

FIG. 20 is a graph showing the x dependency of the Curie point Tc of the samples of the present invention as prepared in an organic solvent system with the additive compounds added after calcination, and that of the comparative samples as prepared in an aqueous system with the additive compounds added before calcination.

DETAILED DESCRIPTION OF THE PREFERRED EMBODIMENTS

Figure 5:
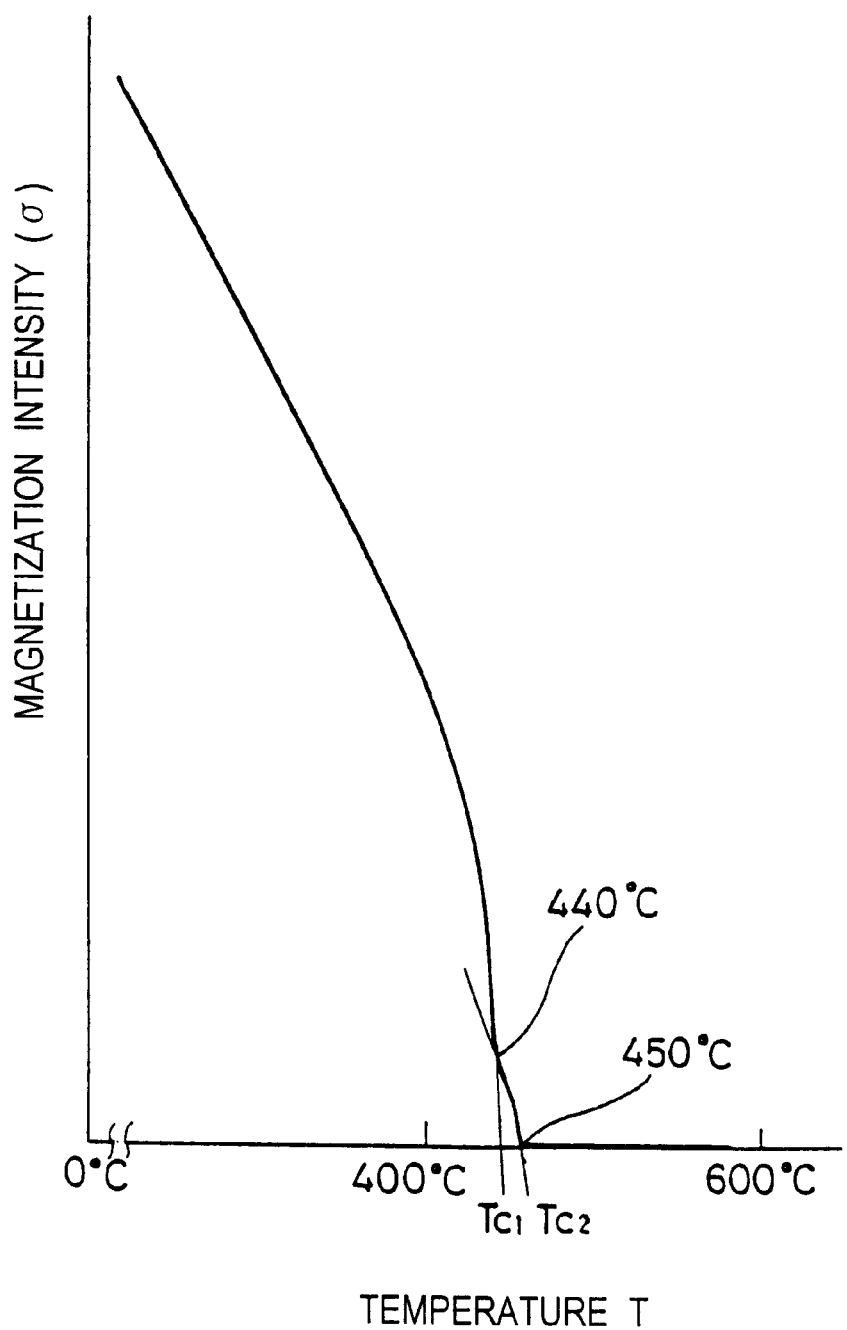
FIG. 5 is a graph showing a σ-T curve of Sample No. 1 of the invention.

The many objects of the present invention are attained by the various aspects (1) to (26) of the present invention described below.

(1) Magnet powder containing a primary phase of a hexagonal ferrite containing A, Co and R, where A represents Sr, Ba or Ca, and R represents at least one element selected from the group consisting of rare earth elements including Y, and Bi, wherein the magnet powder has at least two different Curie temperatures, the two different Curie temperatures are present within a range of from 400 to 480° C., and an absolute value of a difference therebetween is 5° C. or more.

(2) Magnet powder as in (1), wherein R contains at least La (3) Magnet powder as in (1) or (2), wherein the hexagonal ferrite is a magnetoplumbite ferrite.

(4) Magnet powder as in one of (1) to (3), wherein the hexagonal ferrite comprises A', R, Fe, and M, wherein A' represents at least one element selected from Sr, Ba, Ca and Pb, provided that Sr or Ba are essentially included in A', R represents at least one element selected from rare earth elements including Y, and Bi, and M represents Co, or Co and Zn, and proportions of the elements with respect to the total amount of the metallic elements are from 1 to 13 atomic % for A', from 0.05 to 10 atomic % for R, from 80 to 95 atomic % for Fe, and from 0.1 to 5 atomic % for M.

(5) Magnet powder as in any one of (1) to (4), wherein the proportion of Co in M is 10 atomic % or more.

(6) Magnet powder as in any one of (1) to (5), wherein the magnetic powder has a temperature coefficient (absolute value) of a coercive force at from −50 to 50° C. of 0.1%/° C. or less.

(7) A bonded magnet containing magnet powder as in one of (1) to (6).

(8) A motor containing a bonded magnet as in (7).

(9) A magnetic recording medium containing magnet powder as in any one of (1) to (6).

(10) A sintered magnet containing a primary phase of a hexagonal ferrite containing A, Co and R, where A represents Sr, Ba or Ca, and R represents at least one element selected from the group consisting of rare earth elements, y or Br, wherein the sintered magnet has at least two different Curie temperatures, the two different Curie temperatures are present within a range of from 400 to 480° C., and an absolute value of a difference therebetween is 5° C. or more.

(11) A sintered magnet as in (10), wherein R contains at least La.

(12) A sintered magnet as in (10) or (11), wherein the hexagonal ferrite is a 720 magnetoplumbite ferrite.

(13) A sintered magnet as in one of (10) to (12), wherein the hexagonal ferrite comprises A', R, Fe, and M, wherein A' represents at least one element selected from Sr, Ba, Ca and Pb, provided that Sr or Ba are essentially included in A', R represents at least one element selected from rare earth elements including Y, and Bi, and M represents Co, or Co and Zn, and proportions of the elements with respect to the total amount of the metallic elements are from 1 to 13 atomic % for A', from 0.05 to 10 atomic % for R.

from 80 to 95 atomic % for Fe, and from 0.1 to 5 atomic % for M.

(14) A sintered magnet as in any one of (10) to (13), wherein the proportion of Co in M is 10 atomic % or more.

(15) A sintered magnet as in any one of (10) to (14), wherein the sintered magnet has a squareness Hk/HcJ of 90% or more.

(16) A sintered magnet as in any one of (10) to (15), wherein the sintered magnet has a degree of orientation Ir/Is of 96% or more.

(17) A sintered magnet as in one of (10) to (15), wherein the sintered magnet has a ratio of a total X-ray diffraction intensity from the c-plane ($\Sigma I(00L)$) to a total X-ray diffraction intensity from all planes ($\Sigma I(hkL)$) of 0.85 or more.

(18) A sintered magnet as in any one of (10) to (17), wherein the sintered magnet has a temperature coefficient (absolute value) of a coercive force at from −50 to 50° C. of 0.25%/° C. or less.

(19) A motor containing a sintered magnet as in one of (10) to (18).

(20) A magnetic recording medium containing a thin film magnetic layer comprising a primary phase of a hexagonal ferrite containing A, Co and R, where A represents Sr, Ba or Ca, and R represents at least one element selected from the group consisting of rare earth elements including Y, and Bi), wherein the thin film magnetic layer has at least two different Curie temperatures, the two different Curie temperatures are present within a range of from 400 to 480° C., and an absolute value of a difference therebetween is 5° C. or more.

(21) A process for producing a hexagonal ferrite sintered magnet containing a primary phase of a hexagonal ferrite containing A, Co, R and Fe, where A represents Sr, Ba or Ca, and R represents at least one element selected from the group consisting of rare earth elements including Y, and Bi), the process entailing adding a part or all of the constitutional elements to particles comprising a primary phase of a hexagonal ferrite containing at least Sr, Ba or Ca, then molding the resulting mixture and wintering it.

(22) A process for producing a hexagonal ferrite sintered magnet as in (21), wherein a part of the constitutional elements are one or more elements selected from Co and R, where R represents at least one element selected from the group consisting of rare earth elements, y or Bi.

(23) A process for producing a hexagonal ferrite sintered magnet as in (21) or (22), wherein Si and Ca are further added to the particles along with a part or all of the constitutional elements.

(24) A process for producing a hexagonal ferrite sintered magnet as in one of (21) to (23), wherein a dispersant is further added to the particles along with a part or all of the constitutional elements.

(25) A process for producing a hexagonal ferrite sintered magnet as in one of (21) to (24), wherein a part or all of the constitutional elements are added to the particles at comminution stage.

(26) A process for producing a hexagonal ferrite sintered magnet as in (24) or (25), wherein the dispersant is an organic compound having a hydroxyl group or a carboxyl group, its neutralized salt, its lactone, an organic compound having a hydroxymethylcarbonyl group, an organic compound having an enol type hydroxyl group that can be dissociated as an acid, or its neutralized salt, and wherein the organic compound has a carbon number of from 3 to 20 in which a different hydroxyl group is attached to each of at least 50% of the carbon atoms which form no double bond with an oxygen atom.

The present invention is, in part, predicated upon the surprising discovery that magnetoplumbite Sr ferrites, for example those containing La and Co have high magnetic characteristics and excellent temperature characteristics of HcJ, as described in Japanese Patent Application No. 9-56856. However, it has been discovered that in the conventional process for producing the ferrite sintered magnet having that composition, which entails mixing all starting materials to give the basic composition, then calcining the resulting mixture, and pulverizing, molding and sintering it, the magnet produced has a squareness (Hk/HcJ) of only from 80 to 90%. In the production process where the components are added to raw materials being mixed noted above, the essential constitutional components such as Sr, Fe, La, Co and others are added to raw materials while the raw materials not having been calcined are mixed. It has heretofore been considered that the production process of that type is good since the uniformity of the components is easily improved in that process.

For example, the following disclosure is given in Japanese Patent Application Kokai No. 10-149910, page 3, column 4, lines 11 to 17:

"It is desirable that the basic composition mentioned above is substantially formed in the calcination step in the standard production process for ferrite magnets that comprises the steps of mixing→calcination→pulverization→molding→sintering, and the resulting raw material powder is then pulverized. Specifically, adding R and M elements to raw materials in the mixing step in the process is preferred, since the elements are subjected to the two high-temperature treatment steps of calcination and sintering and their solid dispersion is much promoted to give a more uniform composition."

In the examples in the above-mentioned Japanese Patent Application No. 9-56856, the sintered magnets are all produced according to that process. On the other hand, the present inventors previously proposed a production process, in which a high degree of orientation can be obtained by an aqueous process, as described in International Publication No. WO98/25278 (Japanese Patent Application No. 8-337445). However, even when such a process is employed, it is not sufficient as compared with a degree of orientation Ir/Is of from 97 to 98% obtained by a process using an organic solvent system proposed, for example, in Japanese Patent Application Kokai No. 6-53064.

Quite surprisingly, it has now been discovered that a magnet having a high squareness can be obtained by a magnetoplumbite ferrite having a structure exhibiting two different Curie temperatures, as described in Japanese Patent Application No. 9-56856 described above. Furthermore, the employment of this structure can reduce the content of Co.

The present inventors have further discovered that, for realizing the structure, suitable is a process that comprises adding a part or all of at least one elements selected from A, R, Co and Fe, where A represents Sr, Ba or Ca, and R represents at least one element selected from rare earth elements including Y, and Bi, to a ferrite from which a part or all of those elements have been removed, then molding the resulting mixture and sintering it. The present inventors have still further discovered that, in the process, adding an aqueous dispersant, for example, calcium gluconate as in International Publication No. WO98/25278 (Japanese Patent Application No. 8-337445) to the mixture gives a degree of orientation comparable to that to be given by an organic solvent system.

The production process of the present invention will now be described in more detail.

For example, in one typical process heretofore known for producing a sintered magnet having a composition of Sr:La:Fe:Co=0.8:0.2:11.8:0.2, all the elements except the additives for sintering aids, such as $SiO_2$, $CaCO_3$ and others, are mixed in the step of mixing raw materials not having been calcined, then the resulting mixture is calcined, thereafter $SiO_2$, $CaCO_3$ and others are added thereto, and the resulting mixture is pulverized, molded and sintered to give the intended sintered magnet.

Being different from the conventional process, one embodiment of the production process of the present invention for producing the sintered magnet entails mixing raw materials to give a composition of Sr:Fe=0.8:9.6 (=1:12), calcining the resulting mixture (in this step, the calcined powder formed is of an M type Sr ferrite), and thereafter adding thereto La, Fe and Co in a ratio of 0.2:2.2:0.2 to give the final composition of Sr:La:Fe:Co=0.8:0.2:11.8:0.2. In this embodiment, La, Fe and Co may be added to Sr ferrite powder having been prepared through a co-precipitation method, a flux method or the like.

Another embodiment of the process of the present invention for producing the sintered magnet entails mixing raw materials to give a composition of Sr:Fe=0.8:11.8 (=1:14.75), calcining the resulting mixture (in this step, the calcined powder formed has a two-phase state composed of M type Sr ferrite and $\alpha$-$Fe_2O_3$), and thereafter adding thereto La and Co in a ratio of 0.2:0.2 to give the final composition of Sr:La:Fe:Co=0.8:0.2:11.8:0.2.

As in the embodiments noted above, the process of the present invention for producing a sintered magnet that comprises a primary phase of a hexagonal magnetoplumbite ferrite containing A, Co, R and Fe, where A represents Sr, Ba or Ca, and R represents at least one element selected from rare earth elements including Y, or Bi, entails adding at least a part or all of R and Co of the constitutional elements to calcined ferrite grains, then molding the resulting mixture and sintering it, and this realizes the structure of the wintered magnet having two different Curie temperatures (Tc) and realizes the excellent characteristics such as those mentioned above of the sintered magnet. In the process, the elements of A, Co, R and Fe, where A represents Sr, Ba or Ca, and R represents at least one element selected from rare earth elements including Y, or Bi, may be added to the grains in any form of their oxides or even compounds capable of being converted into oxides through sintering, such as carbonates, hydroxides, etc.

The production process mentioned above is for producing a sintered magnet having two Curie points Tc, and this may apply to the production of ferrite grains. Specifically, in place of molding the mixture in the process for producing a sintered magnet mentioned above, the mixture is granulated, then sintered, and optionally again pulverized to give ferrite grains having at least two Tc points. Alternatively, in a process which entails adding the essential components of Sr, Fe, La, Co and others to raw materials not having been calcined, also obtainable are ferrite grains having at least two Tc points so far as the temperature, the time and the atmosphere for the calcination of the raw material mixture are well controlled so as to control the diffusion of La and Co in the mixture being calcined.

Though not clear in detail, and although Applicants do not intend to be bound by any particular theory, the reasons why the structure having two different Curie temperatures can be obtained in the production process mentioned above may be plausibly considered to be as follows. Specifically, in the embodiments mentioned above, the Sr (or Ba or Ca) ferrite reacts with the components (La, Co, Fe) added thereto, and it is believed that the reaction will give an M type ferrite part rich in La and Co and an M type ferrite part poor in them. It is also believed that, when La and Co diffuse into M type ferrite grains, then the concentration of La and Co will be higher in the surface part of the grains (sintered grains) than in the center part thereof The Curie temperature of the grains depends on the degree of substitution of La and Co therein, especially on the degree of substitution of La therein. For these reasons, the phenomenon of at least two Curie temperatures that occurs in the process will reflect the uneven constitution of the components that constitute the structure as produced in the process.

A preferred composition of the M type ferrite of the invention is a composition containing at least optimum amounts of La and Co as a whole of the structure. As a result, while is not lowered, rather Is and $K_1$ are simultaneously increased to increase $H_A$, and thus a high Br value and a high HcJ value are realized. Specifically, in the sintered magnet of the invention, satisfactory characteristics can be obtained when the coercive force HcJ (unit: kOe) and the residual magnetic flux density Br (unit: kG) satisfy the following conditions at an ordinary temperature of about 25° C.:
When HcJ≧

$$Br+\tfrac{1}{3}HcJ \geq 5.75 \qquad (I)$$

When HcJ≧4

$$Br+\tfrac{1}{10}HcJ \geq 4.82 \qquad (II)$$

It has been reported that the conventional Sr ferrite sintered magnet exhibits Br of 4.4 kG and HcJ of 4.0 kOe, but none has been obtained that has HcJ of 4 kOe or more and satisfies the equation (I). In other words, if HcJ is increased, Br must be low. In the sintered magnet of the invention, although the combination addition of Co and Zn lowers the coercive force lower than the case of the single addition of Co, in some cases lower than 4 kOe, the residual magnetic flux density is considerably increased.

At this time, the magnetic characteristics satisfying the equation (II) are obtained. There has been no conventional Sr ferrite sintered magnet having HcJ of less than 4 kOe that satisfies the equation (II).

Because the ferrite of the invention has an anisotropy constant $K_1$ and an anisotropic magnetic field ($H_A$) larger than the conventional ferrite, a larger HcJ can be obtained with the same grain size, and the grain size can be reduced with the same HcJ to be obtained. For example, an HcJ value of 4.5 kOe or more can be obtained with an average grain diameter of the sintered body of from 0.3 to 1 μm, and even in the case of from 1 to 2 μm, an HcJ value of 3.5 kOe or more can be obtained. Accordingly, when the grain size is large, the time for pulverization and molding can be reduced, and the improvement in yield of the product can be realized.

While the present invention exhibits a greater effect of enhancing the HcJ when applied to a sintered magnet, ferrite powder produced according to the invention can be mixed with a binder, such as plastics and rubber, to form a bonded magnet.

Furthermore, a coating type magnetic recording medium can be obtained in such a manner that a coating composition is prepared by mixing and kneading the magnet powder with a binder, and the coating composition is coated on a substrate comprising a resin or the like, followed by hardening if necessary, to form a magnetic layer.

The magnet material of the invention has a small temperature dependency of HcJ, and particularly the magnet powder of the invention has a considerably small temperature dependency of HcJ. Specifically, the sintered magnet of the invention has an absolute value of a temperature coefficient of HcJ within a range of from −50 to 50° C. of 0.25%/° C. or less, which can be easily reduced to 0.20%/° C. or less. The magnet powder of the invention has an absolute value of a temperature coefficient of HcJ within a range of from −50 to 50° C. of 0.1%/° C. or less, which can be easily reduced to 0.05%/° C. or less. Owing to such good temperature characteristics of HcJ, the excellent magnetic characteristics satisfying the equation (III) at −25° C. can be obtained. Such superior magnetic characteristics under the low temperature environment cannot be attained by the conventional Sr ferrite magnet.

$$Br+\tfrac{1}{3}HcJ \geq 5.95 \qquad (III)$$

A Ba ferrite represented by the following formula:

$$Ba_{1-x}M^{3+}_{1-x}Fe_{12-x}M^{2+}_{x}O_{19}$$

is disclosed in *Bull. Acad. Sci. USSR. phys. Ser.* (English Transl.), vol. 25 (1961), pp. 1405–1408 (hereinafter referred to as Reference 1). In this Ba ferrite, $M^{3+}$ is $La^{3+}$, $Pr^{3+}$ or $Bi^{3+}$, and $M^{2+}$ is $Co^{2+}$ or $Ni^{2+}$. While it is not clear how Ba ferrite of Reference 1 is produced and whether the ferrite is in a form of a powder or a sintered body, the ferrite is similar to the Sr ferrite of the invention in the point of inclusion of La and Co. FIG. 1 of Reference 1 shows the change of saturation magnetization depending on the change of x for a Ba ferrite containing La and Co, but in FIG. 1, the saturation magnetization is reduced with the increase of x. Although Reference 1 discloses that the coercive force increases by a few times, specific values are not disclosed. In addition, Reference 1 has no description relating to the Curie temperature Tc of the Ba ferrite.

In the present invention, on the other hand, produced is a hexagonal ferrite sintered magnet having a composition which contains optimum amounts of La and Co and having a structure characterized by at least two Tc points, in which the considerable increase of HcJ and the slight increase of Br are realized, and the considerable improvement in temperature dependency of HcJ is also realized. In addition, in the invention, provided is a hexagonal ferrite magnet powder having a composition which contains optimum amounts of La and Co and having a structure characterized by two Tc points, in which the HcJ is increased and its temperature dependency is considerably reduced. It is firstly found in the present invention that the structure containing La and Co and having at least two Tc points provides such effects.

A Ba ferrite represented by the following formula:

$$La^{3+}Me^{2+}Fe^{3+}_{11}O_{19}$$

where ($Me^{2+}$ : $Cu^{2+}$ $Cd^{2+}$, $Zn^{2+}$, $Ni^{2+}$, $Co^{2+}$ or $Mg^{2+}$) is disclosed in *Indian Journal of Pure and Applied Physics*, vol. 8, July 1970, pp. 412–415 hereinafter referred to as Reference 2). This ferrite differs from the magnet material of the present invention in that it does not contain Sr or Ba or Ca. In addition, in Reference 2, the saturation magnetization as when $Me^{2+}$ is $Co^{2+}$ has a low value of 42 cgs unit at room temperature and 50 cgs unit at 0° K. While specific values are not disclosed, Reference 2 states that it cannot be a magnet material due to a low coercive force. It is considered that this is because the composition of the ferrite of Reference 2 deviates from the scope of the invention. Even though Reference 2 states that Tc of the ferrite where $Me^{2+}$ is $Co^{2+}$ is 800° K. (=527° C.), that Tc greatly deviates from the temperature scope in the invention, and, in addition, no disclosure is given in Reference 2 that may suggest two-stage Tc.

An isometric hexagonal ferrite pigment represented by the following formula:

$$M_x(I(M_y(II)M_z(III)Fe_{12-(y+z)}O_{19}$$

is disclosed in Japanese Patent Application Kokai No. 62-100417 (hereinafter referred to as Reference 3). In the formula, M(O) is a combination of Sr, Ba, a rare earth metal, etc. with a monovalent cation; M(II) is Fe(II), Mn, Co, Ni, Cu, Zn, Cd or Mg; and M(III) is Ti, etc. The hexagonal ferrite pigment disclosed in Reference 3 is similar to the magnet material of the invention in the point that a rare earth metal and Co are simultaneously contained. However, Reference 3 does not disclose any example in that La and Co are simultaneously added, and there is no disclosure that the simultaneous addition of them improves the saturation magnetization and the coercive force. Furthermore, in the examples in Reference 3 where Co is added, Ti is simultaneously added as the element of M(III). Because the element of M(III), particularly Ti, functions as an element lowering the saturation magnetization and the coercive force, it is clear that Reference 3 does not suggest the constitution and the effect of the invention.

An optomagnetic recording medium containing a magnetoplumbite barium ferrite characterized by substituting a part of Ba with La and a part of Fe with Co is disclosed in Japanese Patent Application Kokai No. 62119760 (hereinafter referred to as Reference 4). This Ba ferrite is similar to the Sr ferrite of the invention in the point of inclusion of La and Co. However, the ferrite of Reference 4 is a material for "optomagnetic recording", in which information is written as a magnetic domain in a magnetic thin film by utilizing a heat effect of light, and the information is read out by utilizing a optomagnetic effect, which is of a technical field different from the magnet material of the invention. Furthermore, in Reference 4, Ba, La and Co are essential in the compositional formula (I), and in the formulae (II) and (III), there is only disclosed that an unidentified, trivalent or higher poly-valent metallic ion is added thereto. Reference 4 states that when a tri-valent ion such as Ga, Al, In or the like is added to the composition of the formula (III), Tc of the resulting composition is lowered. However, no disclosure is given in Reference 4 that may suggest two-stage Tc of ferrites.

Japanese Patent Application Kokai No. 10-149910 (hereinafter referred to as Reference 5) discloses a ferrite magnet having a basic composition containing $(Sr_{1-x}R_x)O \cdot n[(Fe_{1-y}M_y)_2O_3]$ where R represents at least one or more of La, Nd and Pr, and M represents at least one or more of Mn, Co, Ni and Zn, and $0.05 \leq x \leq 0.5$, $[x/(2.2n)] \leq y \leq [x \cdot (1.8n)]$, and $5.70 \leq n \leq 6.00$, and a method for producing it. (Reference 5 is a prior application to the present application). The ferrite grams in Reference 5 contain both La and Co, and their composition is partially the same as the composition of the invention. However, Reference 5 has no description relating to Curie temperature, and, in addition, the characteristics in the examples in Reference 5 are poor in which Br=4.3 kG, HcJ=3.5 kOe or so. Reference 5—states as follows, on page 3, column 4, lines 11 to 17:

"It is desirable that the basic composition mentioned above is substantially formed in the calcination step in the standard production process for ferrite magnets that comprises the steps of mixing→calcination→pulverization→molding→sintering, and the resulting raw material powder is then pulverized. Specifically, adding R and M elements to raw materials in the mixing step in the process is preferred, since the elements are subjected to the two high-temperature treatment steps of calcination and sintering and their solid dispersion is much promoted to give a more uniform composition."

The process disclosed in Reference 5 obviously differs from the production process of the present invention, and therefore it is believed that the structure of the sintered body to be obtained from the process of Reference 5 will differ from that obtained from the production process of the present invention.

It has heretofore been known that a hexagonal ferrite of which the composition differs from that of the ferrite of the invention may have two-stage Curie temperatures within a scope of from 400 to 480° C. For example, FIG. 2 in Japanese Patent Application Kokai No. 9-115715 shows two Tc points of an Sr ferrite containing La and Zn.

However, the magnetic characteristics of the ferrite disclosed are not improved. As in Example 7, it is stated that adding $B_2O_3$ to the ferrite is desirable so as to make the ferrite have one-stage Curie temperature. Clearly, it was intended that the magnetic characteristics of the ferrite be improved by increasing the uniformity of the components constituting the ferrite.

In contrast, in the present invention, the hexagonal ferrite having a composition containing A, Co and R is made to have a specific non-uniform structure having at least two-stage Curie temperatures, thereby having excellent magnetic characteristics. The present invention is, at least in part, predicated upon this surprising discovery.

The magnet material of the present invention contains a primary phase of a hexagonal magnetoplumbite ferrite containing Sr, Ba or Ca, Co and R, where R represents at least one element selected from the group consisting of rare earth elements including Y, and Bi, wherein the magnet material has at least two different Curie temperatures Tc1 and Tc2, the two different Curie temperatures Tc1 and Tc2 are present within a range of from 400 to 480° C., and an absolute value of a difference Tc1 and Tc2 is 5° C. or more. Thus, the present magnet material has a structure having such two different Curie temperatures, whereby the squareness Hk/HcJ is markedly improved, and, in addition, the contents of expensive Co and R can be reduced.

The Curie temperature (Tc) is a temperature at which a magnetic material changes from being in a ferromagnetic condition to being in a paramagnetic condition. Some methods are known for measuring Tc. Especially for magnetic materials having a plurality of Tc, a sample to be measured is heated to vary its temperature, and the magnetization-temperature curve (σ-T curve) is drawn, from which is obtained Tc. In this, a vibration sample magnetometer (VSM) is much used for measuring the magnetization. This is because the space for the heater is easily ensured around the sample.

The sample may be either powdery or in the form of a sintered body. For the powdery sample, it must be fixed with a heat-resistant adhesive or the like. For improving the temperature uniformity and compatibility, the sample is preferably as small as possible within the range that ensures the measurement accuracy for magnetization. In the examples of the invention, the samples have a diameter of 5 mm or so and a height of 6.5 mm or so. In addition, in order to make the sample temperature and the ambient temperature the same, it is desirable that the speed of the change in the ambient temperature is lower.

The sample may be either anisotropic or isotropic. For the anisotropic sample, it is desirable that the sample is magnetized in its easily magnetizable axis of the c-axis, and is measured in the c-axis direction. For the isotropic sample, its magnetization is measured in the direction that is the same as the magnetization direction. The magnetization of the sample is effected by applying a satisfactorily strong magnetic field of 10 kOe or more to the sample. In general, the sample is first magnetized at room temperature and is then gradually heated to measure the magnetization of the sample. In this step, it is desirable that no magnetic field is applied to the sample being measured, or if applied, the sample is measured in a weak magnetic field of 1 kOe or less. This is because, if the sample is measured in a strong magnetic field, even paramagnetic components at temperatures higher than the Curie temperature will be detected whereby Tc will be indefinte.

Figure 22:
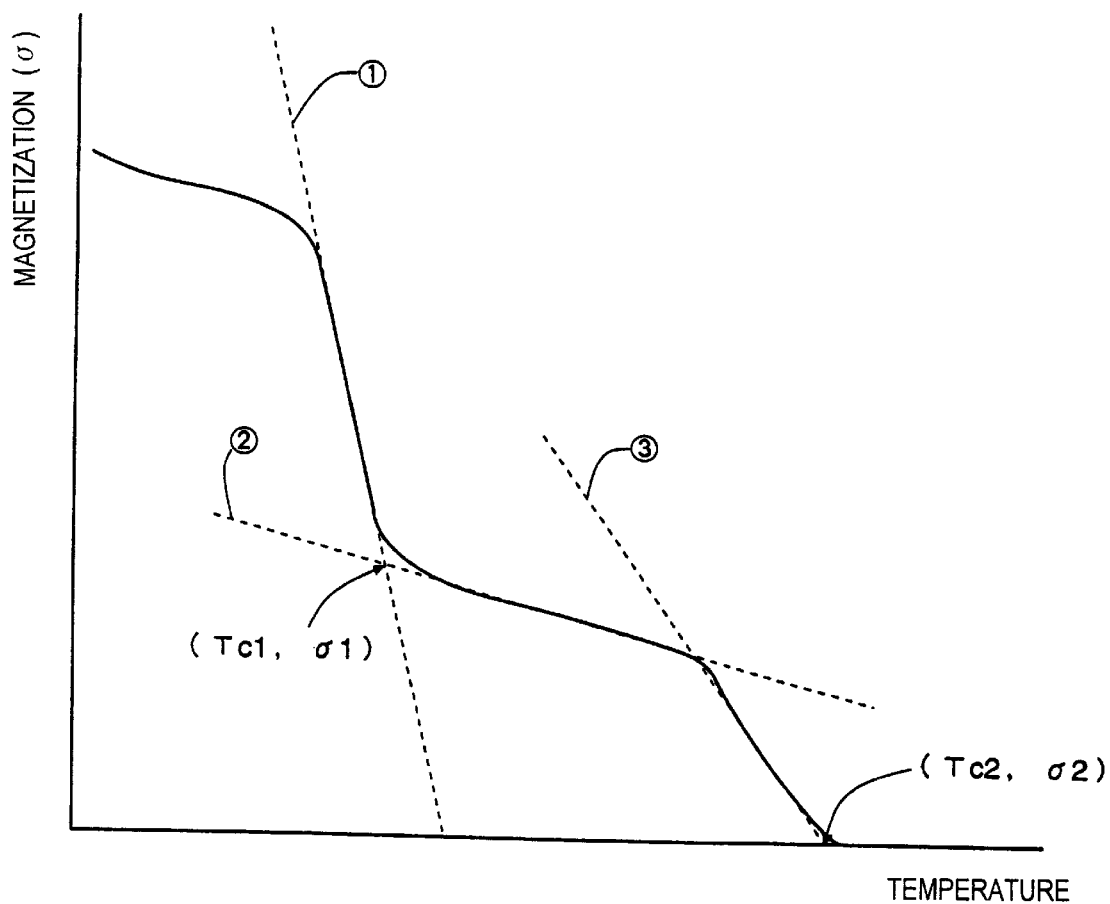
FIG. 22 is a reference graph for explaining the method of obtaining two Curie temperatures.

One example exhibiting two Curie temperatures is shown in FIG. 22. As in FIG. 22, the σ-T curve at temperatures higher than Tc1 has a form as swollen in the upper direction. In this case, the first stage Curie temperature (Tc1) is obtained at the intersection point of the tangential line [1] and the tangential line [2]. The second stage Curie temperature (Tc2) is obtained at the intersection point of the tangential line [3] and the axis of σ=0.

The absolute value of the difference between the two different Curie points Tc1 and Tc2 is 5° C. or more, preferably 10° C. or more. These Curie temperatures fall within the range of from 400 to 480° C., preferably from 400 to 470° C., more preferably from 430 to 460° C. Tc of a pure M type Sr ferrite is 465° C. or so.

The ratio of the magnetization (σ1) at the temperature Tc1 to the magnetization (σRT) at room temperature of 25° C., σ1/σRT preferably falls between 0.5% and 30%, more preferably between 1% and 20%, even more preferably between 2% and 10%. If σ1/σRT is smaller than 0.5%, the second stage Tc2 is substantially difficult to detect. If σ1/σRT oversteps the defined range, the effects of the invention are difficult to obtain.

It is believed that the two Curie temperatures will appear because the texture structure of the ferrite crystals of the invention has a two-phase structure composed of magnetically different M type ferrites, for example, in the production process to be mentioned below. However, in ordinary X-ray diffractometry, a single phase of an M phase is detected.

The squareness Hk/HcJ of the sintered magnet of the invention is preferably 90% or more, more preferably 92% or more, which becomes 95% at most. The sintered magnet of the present invention preferably has a degree of orientation Ir/Is of 96.5% or more, more preferably 97% or more, which becomes about 98% at most. A high Br value can be obtained by increasing the degree of orientation. Since the degree of magnetic orientation of a molded body is influenced by the density of the molded body, accurate evaluation of the molded body will be often impossible. Therefore, the molded body is subjected to X-ray diffractometry at its surface, and its crystallographic degree of orientation (X-ray degree of orientation) is obtained from the plane index and the intensity of the diffraction peaks appeared. Concretely, ΣI(00L)/ΣI(hkL) is used as the X-ray degree of orientation of the molded body. (00L) is an expression of the generic name of the c planes such as (004) and (006), and ΣI(00L) is a total intensity of the peaks of all (00L) planes. (hkL) means all the peaks detected, and ΣI(hkL) is a total intensity thereof. In fact, where a CuKα ray is used as the characteristic X-ray, for example, the measurement is effected within a range of from 10° to 80° for 2 θ, and the peak intensity falling within the range is used for calculation. The X-ray degree of orientation of the shaped body controls the degree of orientation of the sintered body to a relatively great extent. ΣI(00L)/ΣI(hkL) on the c-plane of the sintered body is preferably 0.85 or more, more preferably 0.9 or more, the upper limit of which is about 1.0. In the following examples, the degree of orientation in the figures is expressed by ΣI(001)/ΣI(hk1) in some cases.

The magnet of the invention contains a primary phase of a hexagonal magnetoplumbite ferrite containing Sr, Ba or Ca, Co and R, where R represents at least one element selected from the group consisting of rare earth elements including Y, and Bi, wherein the primary phase is preferably at least one element selected from the group consisting of Sr, Ba, Ca and Pb, and when A' represents an element essentially including Sr or Ba, R represents at least one element selected from the group consisting of rare earth elements including Y, and Bi, and M represents Co, or Co and Zn, the proportions of the elements A', R, Fe and M with respect to the total amount of the metallic elements are: from 1 to 13 atomic % for A', from 0.05 to 10 atomic % for R, from 80 to 95 atomic % for Fe, and from 0.1 to 5 atomic % for M. These are more preferably: from 3 to 11 atomic % for A', from 0.2 to 6 atomic % for R, from 83 to 94 atomic % for Fe, and from 0.3 to 4 atomic % for M.

These are particularly preferably from 3 to 9 atomic % for A', from 0.5 to 4 atomic % for R, from 86 to 93 atomic % for Fe, and from 0.5 to 3 atomic % for M. In the constitutional elements, A' is at least one element selected from the group consisting of Sr, Ba, Ca and Pb, and indispensably contains Sr or Ba. When the amount of A' is too small, the M type ferrite is not formed, or the amount of a non-magnetic phase, such as α-$Fe_2O_3$, is increased. It is desirable that A' indispensably contains Sr. When the amount of A' is too large, the M type ferrite is not formed, or the amount of a non-magnetic phase, such as $SrFeO_{3-x}$, is increased. The proportion of Sr in A' is preferably 51 atomic % or more, more preferably 70 atomic % or more, and especially preferably 100 atomic %. When the proportion of Sr in A' is too small, the improvement in saturation magnetization and the considerable improvement in coercive force cannot be obtained at the same time.

R is at least one element selected from the group consisting of rare earth elements including Y, and Bi. It is preferred that R essentially contains La, Nd and Pr, particularly La. When the amount of R is too small, the amount of M forming a solid solution becomes small, and thus the effect of the invention is difficult to be obtained. The amount of R is too large, the amount of a non-magnetic foreign phase, such as ortho-ferrite, becomes large. The proportion of La in R is preferably 40 atomic % or more, more preferably 70 atomic % or more, and it is most preferred to use only La as R from for the improvement in saturation magnetization. This is because La exhibits the largest limiting amount forming a solid solution with a hexagonal M type ferrite. Therefore, when the proportion of La in R is too small, the amount of R forming a solid solution cannot become large, and as a result, the amount of the element M forming a solid solution also cannot become large, which reduces the effect of the invention. The combination use of Bi lowers the calcination temperature and the sintering temperature, and is advantageous from the standpoint of productivity.

The element M is Co, or Co and Zn. When the amount of M is too small, the effect of the invention is difficult to be obtained. When the amount of M is too large, Br and HcJ are reduced, and the effect of the invention is difficult to be obtained. The proportion of Co in M is preferably 10 atomic % or more, more preferably 20 atomic % or more. When the proportion of Co is too small, the improvement in coercive force becomes insufficient.

The hexagonal magnetoplumbite ferrite is preferably represented by the following formula:

$$A'_{1-x}R_x(Fe_{12-y}M_y)_zO_{19}$$

wherein $0.04 \leq x \leq 0.9$, particularly $0.04 \leq x \leq 0.6$, $0.04 \leq y \leq 0.5$, $0.8 \leq x/y \leq 5$, and $0.7 \leq z \leq 1.2$.

It is more preferably $0.04 \leq x \leq 0.5$, $0.04 \leq y \leq 0.5$, $0.8 \leq x/y \leq 5$, and $0.7 \leq z \leq 1.2$. It is particularly preferably $0.1 \leq x \leq 0.4$, $0.1 \leq y \leq 0.4$, and $0.8 \leq z \leq 1.1$, and especially preferably $0.9 \leq z \leq 1.05$.

In the above formula, when x is too small, i.e., the amount of the element R is too small, the amount of the element M forming a solid solution with the hexagonal ferrite cannot be large, and thus the improving effect of the saturation magnetization and/or the improving effect of the anisotropic magnetic field is insufficient. When x is too large, the element R cannot substitute in the hexagonal ferrite to form a solid solution, and the saturation magnetization is reduced due to the formation of an ortho-ferrite containing the element R. When y is too small, the improving effect of the saturation magnetization and/or the improving effect of the anisotropic magnetic filed is insufficient. When y is too large, the element M is difficult to substitute in the hexagonal ferrite to form a solid solution. Even in the range where the element M can substitute to form a solid solution, deterioration of the anisotropic constant (K1) and the anisotropic magnetic field ($H_A$) is large. When z is too small, the saturation magnetization is reduced since the amounts of non-magnetic phases containing Sr and the element R are increased. When z is too large, the saturation magnetization is reduced since the amount of an $\alpha$-$Fe_2O_3$ phase or a non-magnetic spinet ferrite phase containing the element M is increased. The above formula assumes that no impurities are present.

In the formula (I) above, when x/y is either too small or too large, the valences of the element R and the element M cannot be balanced, and a foreign phase, such as a W type ferrite, is likely to form. As the element M is divalent, when the element R is trivalent, x/y is ideally 1. The permissible range of x/y is largely extended to the direction of more than 1 because even if y is small, the valences can be balanced by the reduction of $Fe^{3+}$ to $Fe^{2+}$.

In the above formula (I) showing the composition, the number of oxygen atoms of 19 means the stoichiometric compositional ratio when all the elements R are trivalent, and x=y and z=1. Thus, the number of oxygen atoms changes depending on the kind of the element R and the values of x, y and z. In the case where the sintering atmosphere is a reducing atmosphere, there is a possibility of forming lack of oxygen (vacancy). Furthermore, while Fe is generally present as trivalent in the M type ferrite, there is a possibility of changing it to divalent. There is a possibility that the valence of the element represented by M, such as Co, is changed, and the proportion of oxygen to the metallic elements is also changed according thereto. While the number of oxygen atoms is shown as 19 irrespective to the kind of R and the values of x, y and z in the specification, the actual number of oxygen atoms may be somewhat deviated from the stoichiometric compositional ratio.

The composition of the ferrite can be measured by fluorescent X-ray quantitative analysis. The presence of the primary phase described above is confirmed by X-ray diffraction and electron beam diffraction.

The magnet powder may contain $B_2O_3$. The calcination temperature and the sintering temperature can be lowered by the addition of $B_2O_3$, which is advantageous from the standpoint of productivity. The content of $B_2O_3$ is preferably 0.5% by weight or less based on the total amount of the magnet powder. When the content of $B_2O_3$ is too large, the saturation magnetization becomes low.

At least one of Na, K and Rb may be contained in the magnet powder. The total content of these elements, as converted into $Na_2O$, $K_2O$ and $Rb_2O$, is preferably 3% by weight or less based on the total amount of the magnet powder. When the content of these element is too large, the saturation magnetization becomes low. As these elements are represented by $M^I$, $M^I$ is contained in the ferrite in the form of the following formula:

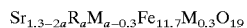

$$Sr_{1.3-2a}R_aM_{a-0.3}Fe_{11.7}M_{0.3}O_{19}$$

In this case, it is preferred that $0.3 \leq a \leq 0.5$. When a is too large, the saturation magnetization becomes low, and additionally a problem arises in that a large amount of the element $M^I$ is evaporated on sintering.

In addition to these impurities, Si, Al Ga, In, Li, Mg, M, Ni, Cr, Cu, Ti, Zr, Ge, Sn, V, Nb, Ta, Sb, As, W and Mo may be contained in the form of oxides in an amount of 1% by weight or less for silicon oxide, 5% by weight or less for aluminum oxide, 5% by weight or less for gallium oxide, 3% by weight or less for indium oxide, 1% by weight or less for lithium oxide, 3% by weight or less for magnesium oxide, 3% by weight or less for manganese oxide, 3% by weight or less for nickel oxide, 5% by weight or less chromium oxide, 3% by weight or less for copper oxide, 3% by weight or less for titanium oxide, 3% by weight or less for zirconium oxide, 3% by weight or less for germanium oxide, 3% by weight or less for tin oxide, 3% by weight or less for vanadium oxide, 3% by weight or less for niobium oxide, 3% by weight or less for tantalum oxide, 3% by weight or less for antimony oxide, 3% by weight or less for arsenic oxide, 3% by weight or less for tungsten oxide, and 3% by weight or less for molybdenum oxide.

The process for producing the sintered magnet is described below.

In the process for producing the sintered magnet containing the above-described ferrite, powders of compounds containing Fe, A, Co and R, wherein A represents Sr, Ba or Ca and optionally contains Pb, and R represents at least one element selected from the group consisting of rare earth elements including Y, and Bi, are used, and a mixture of two or more of those compound powders is calcined. The mixture indispensably contains Fe and A After calcination, one or more of the compound powders containing Fe, A, Co and R, wherein A represents Sr, Ba or Ca and optionally contains Pb, and R represents at least one element selected from the group consisting of rare earth elements including Y, and Bi, are added to and mixed with the calcined mixture, then pulverized, molded and sintered to give the sintered magnet. The compound powders containing Fe, A, Co and R, wherein A represents Sr, Ba or Ca and optionally contains Pb, and R represents at least one element selected from the group consisting of rare earth elements including Y, and Bi, may be of oxides or compounds that are converted into oxides on sintering, for example, carbonates, hydroxides, nitrates, etc. While the average particle size of the raw material powder is not particularly limited, iron oxide is preferably in a form of fine powder, and more preferably has an average size of the primary particle of 1 $\mu$m or less, even more preferably 0.5 $\mu$m or less. The raw material powder may further contain, depending on necessity, in addition to the above-described components, $B_2O_3$ and other compounds, such as compounds containing Si, Al, Ga, In, Li, Mg, Mn, Ni, Cr, Cu, Ti, Zr, Ge, Sn, V, Nb, Ta, Sb, As, W and Mo, as well as unavoidable impurities.

The calcination may be conducted in the air at a temperature of from 1,000 to 1,350° C. for from 1 second to 10 hours, particularly from 1 second to 3 hours.

The resulting calcined body substantially has a magnetoplumbite ferrite structure, and the average particle size of the primary particle-is preferably 2 μm or less, more preferably 1 μm or less, particularly preferably from 0.1 to 1 μm, especially preferably from 0.1 to 0.5 μm. The average particle size can be measured by a scanning electron microscope.

After or during pulverizing the calcined body, at least one or more of the compound powders containing Fe, A, Co and R, wherein A represents Sr, Ba or Ca and optionally contains Pb, and R represents at least one element selected from the group consisting of rare earth elements including Y, and Bi, are mixed with the calcined powder, then molded and sintered to give the sintered magnet. Specifically, it is preferably produced according to the following procedures. The addition amount of the compound powder is from 1 to 100% by volume of the calcined body, preferably from 5 to 70% by volume, and particularly from 10 to 50% by volume.

Of the compounds mentioned above, the R oxides have a relatively large solubility in I5 water and are therefore problematic in that they will flow away during the wet molding step. In addition, since these are hydroscopic, they will often cause an error in weighing. For these reasons, the R compounds are preferably carbonates or hydroxides. p The time at which the compounds are added is not particularly limited if it is after the calcining and before the sintering, but it is preferred to add on pulverizing described later. The kind and amount of the raw material powder to be added are arbitrary, and the same raw material may be added separately before and after the calcination. However, for Co or R, 30% or more, preferably 50% or more of the total amount thereof is preferably added on a step after the calcination. The average powder size of the compound to be added is generally from 0.1 to 2 μm.

In the present invention, wet molding is conducted by using a slurry for molding containing oxide magnetic material grains, water as a dispersing medium, and a dispersant In order to enhance the effect of the dispersant, a wet pulverizing step is provided before the wet molding step. In the case where the calcined material grains are used as the oxide magnetic material grains, since the calcined material grains are generally in a granule form, a dry coarse pulverizing step is preferably provided before the wet pulverizing step for coarse pulverization or deflocculation of the calcined material grains. In the case where the oxide magnetic material grains are produced by a co-precipitation method or a hydrothermal synthesis method, the dry coarse pulverizing step is generally not provided, and the wet pulverizing step is not necessary, but in order to further enhance the degree of orientation, it is preferred to conduct the wet pulverizing step. In the following, the case is described, in which the calcined material grains are used as the oxide magnetic material grains, and the dry coarse pulverizing step and the wet pulverizing step are conducted.

In the dry coarse pulverizing step, pulverization is conducted until the BET specific surface area becomes 2 times to 10 times the initial value. After pulverization, the average particle diameter is preferably about from 0.1 to 1 μm, the BET specific surface area is preferably about from 4 to 10 $m^2/g$, and the CV of the particle diameter is preferably maintained at 80% or less, more preferably from 10 to 70%. The means for pulverization is not particularly limited, and a dry vibration mill, a dry attritor (medium stirring mill) and a dry ball mill can be used. It is preferred to use a dry vibration mill. The pulverizing time is appropriately determined depending on the pulverizing means employed. It is preferred that a part of the raw material powder is added on the dry pulverizing step.

The dry coarse pulverization also has a function of reducing the coercive force HcB by introducing crystal distortion to the calcined material powder. Agglomeration is suppressed by the reduction in the coercive force, and the dispersibility is improved. As a result, the degree of orientation is increased. The crystal distortion having been introduced into the grains is removed in the subsequent wintering step, and the sintered body can be a permanent magnet having a high coercive force.

On the dry coarse pulverization, $SiO_2$ and $CaCO_3$ converted into CaO on sintering are generally added. A part of $SiO_2$ and $CaCO_3$ may be added before the calcination, and in that case, improvement in characteristics is observed. $SiO_2$ and $CaCO_3$ may also be added in the subsequent wet pulverizing step.

After the dry coarse pulverization, a slurry for pulverization containing the pulverized grains and water is prepared, and the wet pulverization is conducted using the same. The content of the calcined material grains in the slurry for pulverization is preferably about 10 to 70% by weight. The means for pulverizing used in the wet pulverization is not particularly limited, a ball mill, an attritor and a vibration mill are generally preferably used. The pulverizing time is appropriately determined depending on the pulverizing means employed.

After the wet pulverization, a slurry for molding is prepared by condensing the slurry for pulverization. The condensation can be conducted by centrifugation. The content of the calcined material grains in the slurry for molding is preferably about from 60 to 90% by weight.

In the wet molding step, molding is conducted in the presence of a magnetic field by using the slurry for molding. The pressure for molding can be about from 0.1 to 0.5 $ton/cm^2$, and the applied magnetic field can be about from 5 to 15 kOe.

The use of a non-aqueous dispersing medium in the slurry for molding is preferred since a high degree of orientation is obtained. In the invention, however, the slurry for molding using an aqueous dispersing medium containing a dispersant is employed. Examples of the dispersant that is preferably used in the invention include an organic compound having a hydroxyl group or a carboxyl group, its neutralized salt, its lactone, an organic compound having a hydroxymethylcarbonyl group, an organic compound having an enol type hydroxyl group that can be dissociated as an acid, and its neutralized salt.

In the case where a non-aqueous dispersing medium is used, as described in e.g., Japanese Patent Application Kokai No. 6-53064, a surface active agent of, for example, oleic acid, stearic acid and their metal salts is added to an organic solvent, such as toluene and xylene, to form a dispersing medium. By using such a dispersing medium, a high degree of magnetic orientation of 98% at the highest even when ferrite grains of a submicron size, which are hard to be dispersed, are employed.

The above-described organic compounds to be a dispersant for the aqueous dispersing medium have a carbon number of from 3 to 20, preferably from 4 to 12, in which hydroxyl groups are bonded to 50% or more of the carbon atoms except for the carbon atoms attached to oxygen atoms via a double bond. When the carbon number is 2 or less, the effect of the invention cannot be obtained. Even when the carbon number is 3 or more, if the ratio of carbon atoms, to which hydroxyl groups are attached, except for the carbon atoms attached to oxygen atoms via a double bond is less than 50%, the effect of the invention cannot be obtained. The ratio of the carbon atoms, to which hydroxyl groups are attached, is limited to the above-described organic compounds, and there is no limitation for the dispersants themselves. For example, when a lactone of an organic compound having a hydroxyl group and a carboxyl group (hydroxycarboxylic acid) is used as the dispersant, the ratio of the carbon atoms, to which hydroxyl groups are attached is applied to the hydroxycarboxylic acid itself but not to the lactone.

The basic skeleton of the above-described organic compounds may be a chainlike structure or a cyclic structure, and may be saturated or may contain an unsaturated bond.

A hydroxycarboxylic acid and its neutralized salt or lactone are preferred as the dispersant. Particularly, gluconic acid (C=6, OH=5, COOH=1) and its neutralized salt or lactone, lactobionic acid (C=12, OH=8, COOH=1) and its neutralized salt or lactone, tartaric acid (C=4, OH=2, COOH=2) and its neutralized salt or lactone, and glucoheptonic acid γ-lactone (C=7, OH=5) are preferred. Among these, gluconic acid and its neutralized salt or lactone are particularly preferred since they provide a high effect of improving the degree of orientation and are not expensive.

Sorbose is preferred as the organic compound containing a hydroxymethylcarbonyl group.

Ascorbic acid is preferred as the organic compound having an enol type hydroxyl group that can be dissociated as an acid.

In the present invention, citric acid and its neutralized salt can be used as the dispersant. While citric acid has a hydroxyl group and a carboxyl group, it does not satisfy the condition in that hydroxyl groups are bonded to 50% or more of the carbon atoms except for the carbon atoms attached to oxygen atoms via a double bond. However, citric acid provides an effect of improving the degree of orientation The structures of a part of the preferred dispersants described above are shown below.

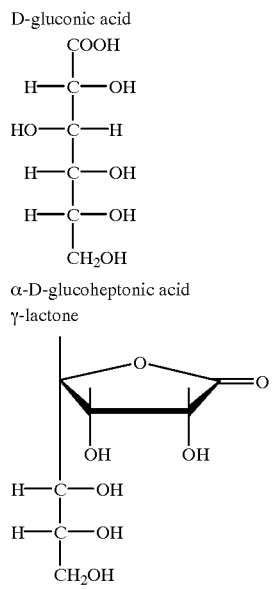

Lactobionic acid

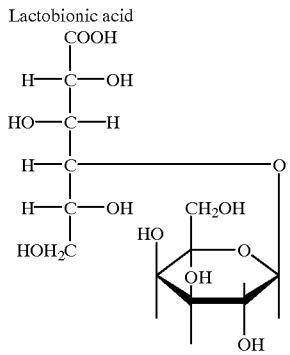

(R, R)-tartaric acid

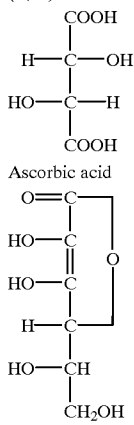

Ascorbic acid

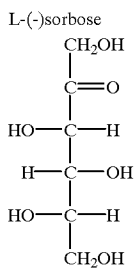

L-(−)sorbose $$\begin{array}{c} CH_2OH \\ | \\ C=O \\ | \\ HO-C-H \\ | \\ H-C-OH \\ | \\ HO-C-H \\ | \\ CH_2OH \end{array}$$

The degree of orientation by the magnetic field orientation is influenced by the pH of the supernatant liquid of the slurry. Specifically, when the pH is too low, the degree of orientation is decreased, and the residual magnetic flux density after sintering is influenced therefrom. In the case where a compound exhibiting an acidic nature in an aqueous solution, such as hydroxycarboxylic acid, is used as the dispersant, the pH of the supernatant liquid of the slurry becomes low. Therefore, it is preferred that the pH of the supernatant liquid of the slurry is adjusted, for example, by adding a basic compound along with the dispersant. As the basic compound, ammonia and sodium hydroxide are preferred. Ammonia may be added as aqueous ammonia. The lowering of the pH can also be prevented by using a sodium salt of a hydroxycarboxylic acid.

In the case where $SiO_2$ and $CaCO_3$ are added as auxiliary components as in a ferrite magnet, when a hydroxycarboxylic acid or its lactone is used as the dispersant, $SiO_2$ and $CaCO_3$ effuse along with the supernatant liquid of the slurry mainly on the preparation of the slurry for molding, and the desired performance cannot be obtained, for example, HcJ is decreased. When the pH is heightened by adding the basic compound, the effusing amount of $SiO_2$ and $CaCO_3$ becomes larger. On the other hand, the use of a calcium salt of a hydroxycarboxylic acid can suppress the effusion of $SiO_2$ and $CaCO_3$. By adding an excess amount of $SiO_2$ and $CaCO_3$ on adding the basic compound or on using the sodium salt as the dispersant, the shortage of the amounts of $SiO_2$ and $CaCO_3$ in the magnet can be prevented. When the ascorbic acid is used, there is substantially no effusion of $SiO_2$ and $CaCO_3$.

Because of the above-described reasons, the pH of the supernatant liquid of the slurry is preferably 7 or more, more preferably from 8 to 11.

The kind of the neutralized salt used as the dispersant is not particularly limited, and may be any of a calcium salt, a sodium salt, etc. Because of the above described reasons, a calcium salt is preferably used When a sodium salt is used as the dispersant, or aqueous ammonia is added, a problem arises in that cracks are liable to be formed in the molded body or the sintered body, in addition to the effusion of the auxiliary components.

The dispersant may be used in combination of two or more kinds thereof.

The addition amount of the dispersant is preferably from 0.05 to 3.0% by weight, more preferably from 0.10 to 2.0% by weight, based on the calcined material grains as the oxide magnetic material grains. When the amount of the dispersant is too small, the improvement in degree of orientation becomes insufficient. When the amount of the dispersant is too large, cracks are liable to be formed in the molded body and the sintered body.

In the case where the dispersant is one that can be ionized in an aqueous solution, such as an acid or a metallic salt, the addition amount of the dispersant is the ion-converted value, i.e., the addition amount is obtained by converting to only the organic component except for a hydrogen ion and a metallic ion. In the case where the dispersant is a hydrate, the addition amount is obtained with excluding crystallization water. For example, when the dispersant is calcium gluconate monohydrate, the addition amount is obtained by converting into gluconic ion.

In the case where the dispersant is a lactone or contains a lactone, the addition amount is obtained by converting into a hydroxycarboxylic ion with assuming that the whole lactone are split into a hydroxycarboxylic acid.

The time at which the dispersant is added is not particularly limited. The dispersant may be added on the dry coarse pulverizing step or the preparation of the slurry for pulverization for the wet pulverizing step. A part of the dispersant may be added on the dry coarse pulverizing step and the balance may be added on the wet pulverizing step. Alternatively, it may be added after the wet pulverizing step with stirring. In any case, the dispersant is present in the slurry for molding, and thus the effect of the invention can be obtained. The addition on the pulverizing step, particularly on the dry coarse pulverizing step, provides higher effect of improving the degree of orientation. It is considered that this is because in the vibration mill used in the dry coarse pulverization, a larger energy is applied to the grains, and the temperature of the grains is increased, in comparison to the ball mill used in the wet pulverization, and thus the conditions in which chemical reactions are liable to occur is realized. It is considered that by adding the dispersant on the dry coarse pulverizing step, the amount of the dispersant adsorbed on the surface of the grains becomes larger, and consequently a higher degree of orientation can be obtained. When the residual amount of the dispersant in the slurry for molding (which is substantially the same as the adsorbed amount) is actually measured, the ratio of the residual amount to the addition amount becomes higher in the case where the dispersant is added on the dry coarse pulverizing step than the case where the dispersant is added on the wet pulverizing step. In the case where the addition of the dispersant is conducted by separating to plural addition operations, the addition amounts of each of the addition operations are determined in such a manner that the total addition amount is in the preferred range as described above.

After the molding step, the molded body is heat treated in the air or nitrogen at a temperature of from 100 to 500° C. to sufficiently remove the dispersant added. The molded body is sintered in the subsequent sintering step, for example, in the air at a temperature of from 1,150 to 1,250° C., preferably from 1,160 to 1,220° C., for about from 0.5 to 3 hours, to obtain an anisotropic ferrite magnet.

The average crystal grain diameter of the magnet of the invention is preferably 2 $\mu$m or less, more preferably 1 $\mu$m or less, and especially preferably from 0.5 to 1.0 $\mu$m. Even if the average crystal grain diameter exceeds 1 $\mu$m in the invention, a sufficiently high coercive force can be obtained. The crystal grain diameter can be measured with a scanning electron microscope. The specific resistivity is about $10°$ m or more.

The sintered magnet can also be obtained in such a manner that the molded body is pulverized by using a crusher and classified to have the average grain diameter of about from 100 to 700 $\mu$m by a sieve to obtain a magnetic orientation granules, which is then subjected to a dry molding in the presence of a magnetic field, and the resulting molded body is sintered.

The magnet powder can be obtained in such a manner that after the pulverization using the slurry of the calcined material, the slurry is dried and sintered.

The present invention involves a magnetic recording medium comprising a thin film magnetic layer. The thin film magnetic layer has a hexagonal magnetoplumbite ferrite phase as similar to the magnet powder of the invention. The content of impurities is equivalent to the above described embodiments.

By using the magnet of the present invention, the following effects can generally obtained and superior application products can be obtained. That is, in the case where the magnet of the invention has the same dimension as the conventional ferrite products, because the magnetic flux density generated from the magnet can be increased, it contributes to the provision of application products having higher performance, for example, a high torque can be obtained in the case of a motor, and a good sound quality with high linearity can be obtained due to the reinforcement of the magnetic circuit in the case of a speaker or a headphone. In the case where the same performance as the conventional magnet is enough, the size (thickness) of the magnet can be small (thin), and it contributes to make application products small-sized and lightweight (thin). Furthermore, in the motor using a wound type electromagnet as a magnet for a field system, the electromagnet can be replaced by the ferrite magnet to contribute to provision of the motor of lightweight and low cost, and the reduction in production process thereof Furthermore, because the magnet of the invention is excellent in temperature characteristics of the coercive force (HcJ), it can be used under the low temperature conditions, under which the conventional ferrite magnet involves a danger of low temperature demagnetization (permanent demagnetization), and thus the reliability of products used in cold areas and areas highly above the sea level can be considerably increased.

The magnet material of the present invention is worked into prescribed shapes and is used in the wide range of applications described below.

The magnet material of the present invention can be preferably used as a motor for an automobile, such as for a fuel pump, a power window, an antilock brake system, a fan, a windshield wiper, a power steering, an active suspension system a starter, a door lock system and an electric side mirror; a motor for an office automation and audio-visual apparatus, such as for an FDD spindle, a VTR capstan, a VTR rotation head, a VTR reel, a VTR loading system, a camcorder capstan, a camcorder rotation head, a camcorder zooming system, a camcorder focusing system, a capstan for a combination tape recorder and radio, a spindle for a compact disk player, a laser disk player and a minidisk player, a loading system for a compact disk player, a laser disk player and a minidisk player, and an optical pickup for a compact disk player and a laser disk player, a motor for a home electric apparatus, such as for an air compressor for a air conditioner, a compressor for a refrigerator, driving an electric tool, an electric fan, a fan for a microwave oven, a rotation system for a plate of a microwave oven, driving a mixer, a fan for a hair dryer, driving a shaver and an electric toothbrush; a motor for a factory automation, such as for driving an axis and ajoint of an industrial robot, a main driver of an industrial robot, driving a table of a working apparatus, and driving a belt of a working apparatus; and a motor for other applications, such as for a generator of a motor bike, a magnet for a speaker and a headphone, a magnetron tube, a magnetic field generator for an MRI system, a clamper for a CD-ROM, a sensor of a distributor, a sensor of an antilock brake system, a level sensor for a fuel and an oil, and a magnet clutch.

Reference will now be made to certain Examples which are provided solely for purposes of illustration and are not intended to be limitative.

EXAMPLE 1

Sintered magnet of Sample Nos. 1 and 2 were prepared by using an aqueous system with the additive compounds added after calcination.

As raw materials, the following materials were used.

| | |
|---|---|
| $Fe_2O_3$ powder (primary particle size: 0.3 $\mu$m) (containing Mn, Cr, Si and Cl as impurities) | 1,000.0 g |
| $SrCO_3$ powder (primary particle size: 2 $\mu$m) (containing Ba and Ca as impurities) | 161.2 g |

As additives, the following materials were used.

| | |
|---|---|
| $SiO_2$ powder (primary particle size: 0.01 $\mu$m) | 2.30 g |
| $CaCO_3$ powder (primary particle size: 1 $\mu$m) | 1.72 g |

The raw materials and the additives were pulverized in a wet attritor, followed by drying and rectification of granules, and sintered in the air at 1,250° C. for 3 hours, to obtain a calcined material in the form of granules.

To the resulting calcined material, $SiO_2$, $CaCO_3$, lanthanum carbonate ($La_2(CO_3)_3 \cdot 8H_2O$) and cobalt oxide (CoO) were added in the amounts shown in Table 1, and calcium gluconate was further added in the amount shown in Table 1, followed by dry coarse pulverization for 20 minutes by a batch vibration rod mill. At this time, distortion due to pulverization was introduced, and the HcJ of the calcined material grains was lowered to 1.7 kOe.

Next, 177 g of the coarse pulverized material produced in the same manner as above was collected, and 37.25 g of the same iron oxide ($\alpha$-$Fe_2O_3$) was added thereto, 5 and 400 cc of water was further added thereto as a dispersing medium, to prepare a slurry for pulverization.

By using the slurry for wet pulverization, wet pulverization was conducted in a ball mill for 40 hours. The specific surface area after the wet pulverization was 8.5 $m^2$/g (average grain diameter: 0.5 $\mu$m). The pH of the supernatant liquid of the slurry after the wet pulverization was 9.5.

After the wet pulverization, the slurry for pulverization was subjected to centrifugation to adjust the concentration of the calcined material in the slurry to 78%, so as to prepare a slurry for molding. Compression molding was conducted by using the slurry for molding with removing water from the slurry. The molding was conducted while applying a magnetic field in the direction of compression of about 13 kOe. The resulting molded body had a cylindrical shape having a diameter of 30 mm and a height of 18 mm. The molding pressure was 0.4 ton/$cm^2$. A part of the slurry was dried and fired at 1,000° C. to convert the whole contents thereof to oxides, and it was subjected to the fluorescent X-ray quantitative analysis to obtain the contents of the components. The results obtained are shown in Tables 2 and 3.

The molded body was subjected to a heat treatment at a temperature of from 100 to 300° C. to sufficiently remove gluconic acid, and then sintered in the air with a temperature increasing rate of 5° C./min, followed by maintained at 1,220° C. for 1 hour, to obtain a sintered body. The upper and lower surfaces of the resulting sintered body were worked, and was measured for the residual magnetic flux density (Br), the coercive force (H1cJ and Hcb), the maximum energy product ((BH)max), the saturation magnetization ($4\pi Is$), the degree of magnetic orientation (Ir/Is), and the squareness (Hk/HcJ). The sample was then worked into a column of 5 mm in diameter and 6.5 mm in height (in this, the height direction is the c- axis direction). The column sample was magnetized, and then its Curie temperature Tc was obtained by measuring the temperature dependency of the residual magnetization in the c- axis direction by a vibration sample magnetometer (VSM. During the measurement, no magnetic field was applied to the sample.

Figure 6:
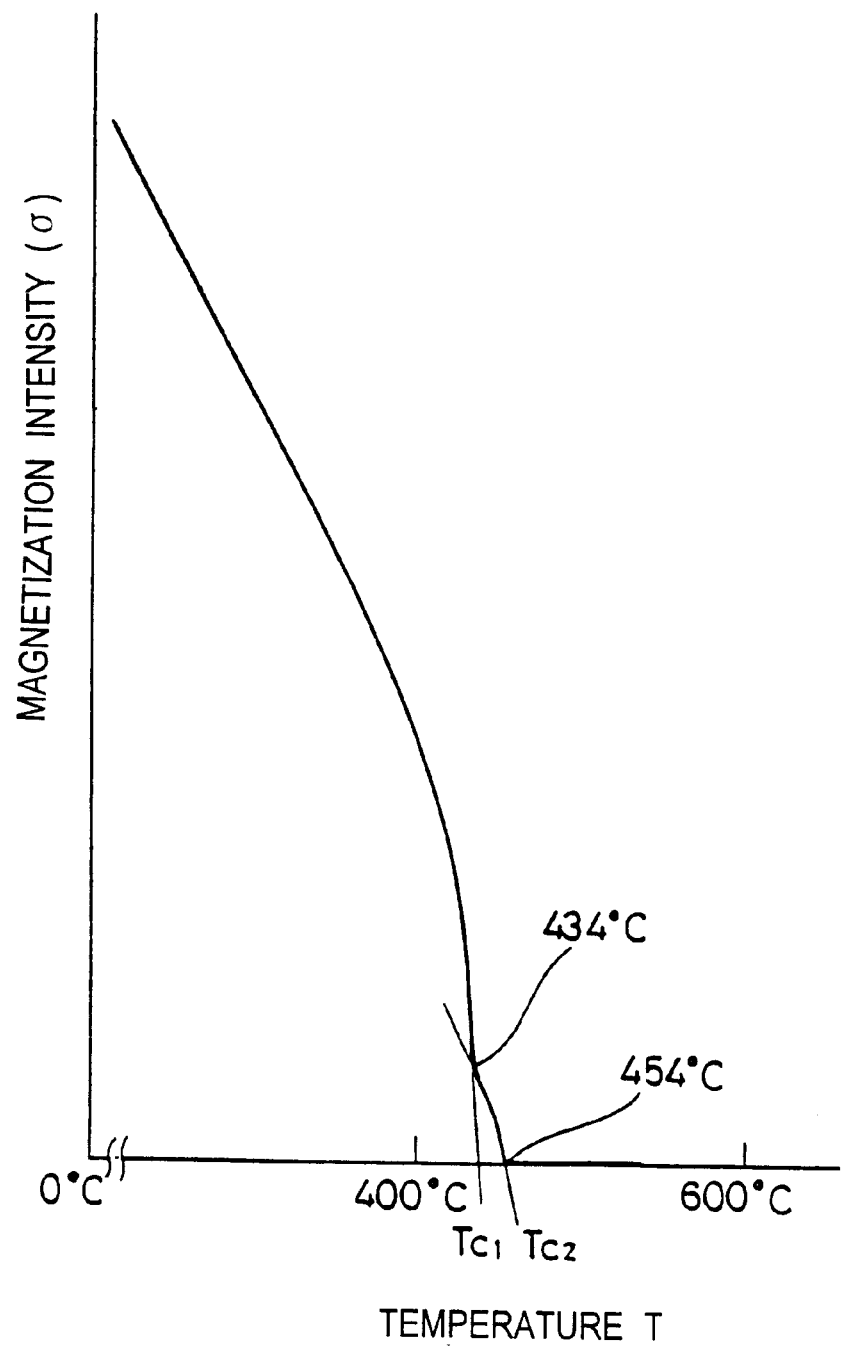
FIG. 6 is a graph showing a σ-T curve of Sample No. 2 of the invention.

The measurement method is described in more detail. First, a magnetic field of about 20 kOe was applied at room temperature to the column sample in its height direction (c axis direction) so as to magnetize the sample. Next, the magnetic field current was cut to be 0 (zero). In this step, however, a magnetic field of about 50 Oe was generated due to the residual magnetization of the magnetic poles. Then, the sample was heated with a heater having been disposed around it, at a heating rate of about 10° C./min, and the temperature and the magnetization of the sample were measured at the same time. Based on the thus measured data, a $\sigma$-T curve was drawn. The results obtained are shown in FIGS. 5 and 6. The SEM photographs of the structures in a- axis and c- axis of Sample No. 1 are shown in FIGS. 1 and 2, respectively.

It is clear from FIGS. 5 and 6 that Sample Nos. 1 and 2 of the invention each has two Curie temperatures of 440° C. and 456° C. for Sample No. 1 and 434 C. and 454° C. for Sample No. 2. The ratio of a at the first stage Tc (Tel) and that of a at 25° C. were 5.5% and 6.0%, respectively. At temperatures above Tc1, the $\sigma$-T curve swell up in the upper direction, in which Tc1 and Tc2 were clearly identified. It is considered therefrom that the sintered bodies of the samples of the invention have a two-phase structure in which the phases have magnetic characteristics different from each other. The samples were subjected to X-ray diffractometry, and as a result the samples were of a monophase of an M type ferrite. No great difference in lattice index therebetween.

COMPARATIVE EXAMPLE 1

Sintered magnet of Sample No. 3 was prepared by using an aqueous system with the additive compounds added before calcination.

As raw materials, the following materials were used.

| | |
|---|---|
| $Fe_2O_3$ powder (primary particle size: 0.3 μm) (containing Mn, Cr, Si and Cl as impurities) | 1,000.0 g |
| $SrCO_3$ powder (primary particle size: 2 μm) (containing Ba and Ca as impurities) | 130.3 g |
| Cobalt oxide | 17.56 g |
| $La_2O_3$ | 35.67 g |

As additives, the following materials were used.

| | |
|---|---|
| $SiO_2$ powder (primary particle size: 0.01 μm) | 2.30 g |
| $CaCO_3$ powder (primary particle size: 1 μm) | 1.72 g |

The raw materials and the additives were pulverized in a wet attritor, followed by drying and rectification of granules, and sintered in the air at 1,250° C. for 3 hours, to obtain a calcined material in the form of granules. The magnetic characteristics of the resulting calcined material were measured with a vibration sample magnetometer (VSM), and as a result, the saturation magnetization as was 68 emu/g and the coercive force HcJ was 4.6 kOe.

To the resulting calcined material, $SiO_2$ and $CaCO_3$ were added in the amounts shown in Table 1, and calcium gluconate was further added in the amount shown in Table 1, followed by dry coarse pulverization for 20 minutes by a batch vibration rod mill. At this time, distortion due to pulverization was introduced, and the HcJ of the calcined material grains was lowered to 1.7 kOe.

Next, 210 g of the coarse pulverized material thus produced was collected, and 400 cc of water was further added thereto as a dispersing medium, to prepare a slurry for pulverization.

By using the slurry for wet pulverization, wet pulverization was conducted in a ball mill for 40 hours. The specific surface area after the wet pulverization was 8.5 $m^2/g$ (average particle diameter: 0.5 μm). The pH of the supernatant liquid of the slurry after the wet pulverization was from 9 to 10.

After the wet pulverization, the slurry for pulverization was subjected to centrifugation to adjust the concentration of the calcined material in the slurry to about 78%, so as to prepare a slurry for molding. Compression molding was conducted by using the slurry for molding with removing water from the slurry. The molding was conducted while applying a magnetic field in the direction of compression of about 13 kOe. The resulting molded body had a columnar shape having a diameter of 30 mm and a height of 18 mm. The molding pressure was 0.4 ton/$cm^2$. A part of the slurry was dried and fired at 1,000° C. to convert the whole contents thereof to oxides, and it was subjected to the fluorescent X-ray to quantitative analysis to obtain the contents of the components. The results obtained are shown in Tables 2 and 3.

The molded body was subjected to a heat treatment at a temperature of from 100 to 360° C. to sufficiently remove gluconic acid, and then sintered in the air with a temperature increasing rate of 5° C./min, followed by maintained at 1,220° C. for 1 hour, to obtain a sintered body.

Figure 7:
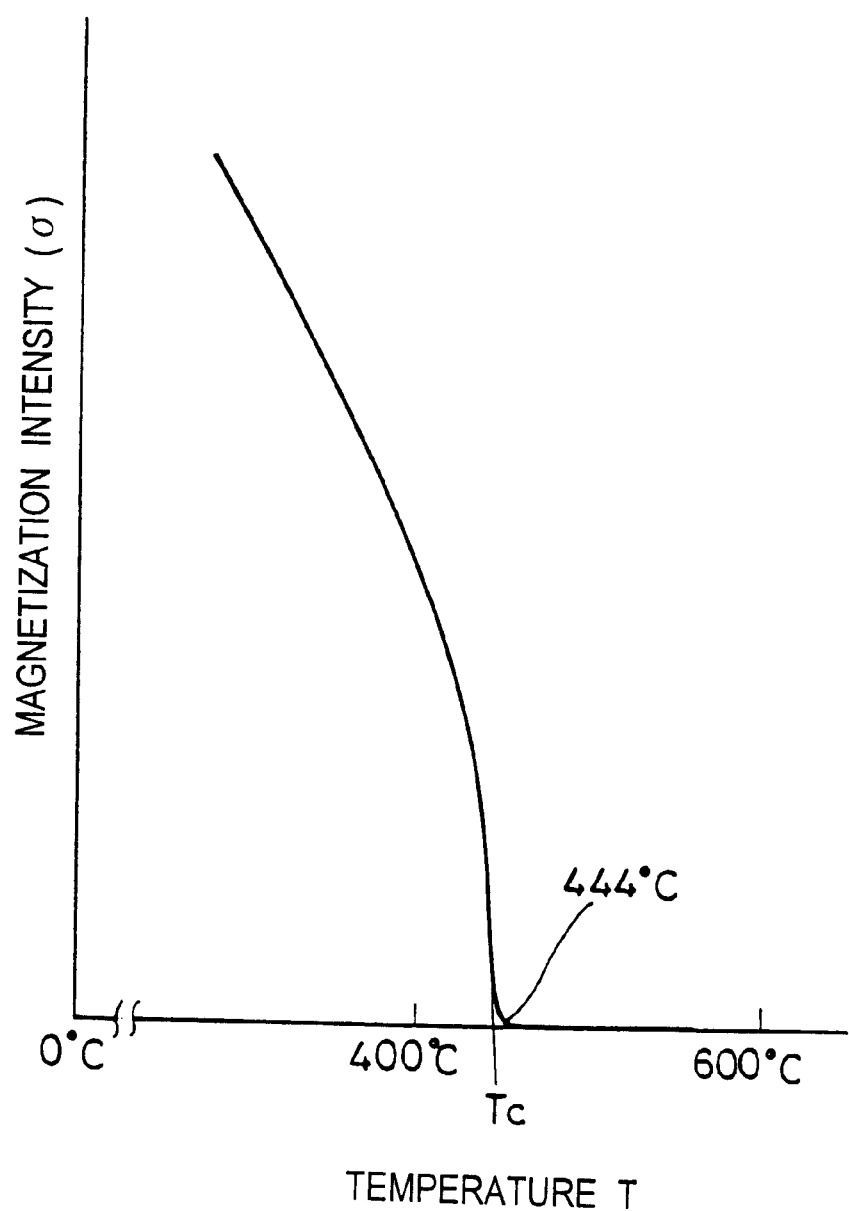
FIG. 7 is a graph showing a σ-T curve of Comparative Sample No. 1.

The upper and lower surfaces of the resulting sintered body were worked, and was measured for the residual magnetic flux density (Br), the coercive force (HcJ and Hcb), the maximum energy product ((BH)max), the saturation magnetization (4πIs), the degree of magnetic orientation (Ir/Is), and the squareness HcJ). The results are shown in Table 4. The sample was then worked into a shape of 5 mm in diameter and 6.5 mm in height In the same manner as in Example 1, the Curie temperature Tc was obtained by measuring the temperature dependency of the magnetization in the c- axis direction by VSM. The results obtained are shown in FIG. 7. It is clear from FIG. 7 that the sample has one Curie temperature of 444° C.

The specific resistivity in the a axis direction and the c axis direction of the sintered body samples Nos. 1 to 3 were measured. The results are shown in Table 5. The SEM photographs of the structures observed from the a axis direction and the c axis direction for Sample No. 3 were shown in FIGS. 3 and 4. It is clear from FIGS. 1 to 4 that the ferrite of the present invention has a larger grain size in comparison to the conventional ferrite shown in FIGS. 3 and 4.

TABLE 1

| Sample | Calcined material (g) | Lanthanum oxide (g) | Cobalt oxide (g) | Calcium gluconate (g) | $SiO_2$ (g) | $CaCO_3$ (g) |
|---|---|---|---|---|---|---|
| 1 | 87.26 | 6.21 | 1.63 | 1.13 | 0.44 | 1.38 |
| 2 | 87.26 | 7.23 | 1.63 | 1.33 | 0.44 | 1.38 |
| 3* | 110 | — | — | 1.33 | 0.44 | 1.38 |

*Comparative Example

TABLE 2

| Sample | $Fe_2O_3$ (mol %) | MnO (mol %) | SrO (mol %) | BaO (mol %) | $SiO_2$ (mol %) | CaO (mol %) | $La_2O_3$ (mol %) | CoO (mol %) | (Fe + CO)/(Sr + La) (molar ratio) | La/Co (molar ratio) |
|---|---|---|---|---|---|---|---|---|---|---|
| 1 | 80.9 | 0.64 | 10.72 | 0.10 | 1.25 | 2.32 | 1.37 | 2.55 | 12.2 | 1.1 |
| 2 | 80.91 | 0.64 | 10.59 | 0.10 | 1.24 | 2.31 | 1.55 | 2.53 | 12.0 | 1.2 |
| 3* | 80.71 | 0.64 | 10.95 | 0.10 | 1.26 | 2.23 | 1.36 | 2.64 | 12.0 | 1.0 |

*Comparative Example

TABLE 3

| Sample | Fe | Mn | Sr | Ba | Si | Ca | Zn | La | Co | Al | Cr | Cu |
|---|---|---|---|---|---|---|---|---|---|---|---|---|
| 1 | 88.7 | 0.4 | 5.9 | 0.0 | 0.7 | 1.3 | 0.0 | 1.5 | 1.4 | 0.0 | 0.1 | 0.0 |
| 2 | 88.6 | 0.3 | 5.8 | 0.0 | 0.7 | 1.3 | 0.0 | 1.7 | 1.4 | 0.0 | 0.1 | 0.0 |
| 3* | 88.7 | 0.3 | 6.0 | 0.1 | 0.7 | 1.2 | 0.0 | 1.5 | 1.5 | 0.0 | 0.0 | 0.0 |

Note: All numerals are in terms of atomic %.
*Comparative Example

TABLE 4

| Sample | 4πIs (KG) | Br (KG) | HcJ (kOe) | Ir/Is (%) | Hk/HcJ (%) | (BH)max (MGOe) | Sintered density (g/cm³) |
|---|---|---|---|---|---|---|---|
| 1 | 4.47 | 4.34 | 4.60 | 97.2 | 91.7 | 4.6 | 5.02 |
| 2 | 4.49 | 4.37 | 4.75 | 97.3 | 93.4 | 4.7 | 5.02 |
| 3* | 4.52 | 4.33 | 4.61 | 95.8 | 89.5 | 4.5 | 5.06 |

*Comparative Example

TABLE 5

| Sample | Conditions | ρ-a(Ωm) | ρ-c(Ωm) |
|---|---|---|---|
| 1 | Addition after calcination (stoichiometric composition) | $4.79 \times 10^1$ | $1.47 \times 10^2$ |
| 2 | Addition after calcination (La-rich composition) | $1.00 \times 10^1$ | $6.13 \times 10^1$ |
| 3* | Addition before calcination (stoichiometric composition) | $2.00 \times 10^3$ | $6.44 \times 10^3$ |

*Comparative Example

It is clear from Table 4 that the cores of the sintered bodies within the scope of the invention exhibited excellent characteristics.

It is clear from Table 5 that Sample Nos. 1 and 2 of 5 the invention obtained by the process of addition after the calcination exhibited smaller specific resistivities of $\frac{1}{10}$ to $\frac{1}{100}$ of that of the comparative sample obtained by the process of addition before the calcination. It is considered therefrom that the sample obtained by the process of addition before the calcination and the samples obtained by the process of addition after the calcination are different in fine structures of the sintered bodies. Among the samples according to the invention, Sample No. 2 having the La-rich composition exhibited a smaller specific resistivity of $\frac{1}{4}$ to $\frac{1}{2}$ of that of Sample No. 1. In all the samples, the values of the a axis direction were smaller than the values of the c axis direction.

EXAMPLE 2

A comparison was made for the addition of Fe, La and Co after calcination.

The composition as in Example 1 ($SrFe_{12}O_{19}$+$SiO_2$: 0.2% by weight+$CaCO_3$: 0.15% by weight) was calcined in the same manner as in Example 1, to obtain a calcined material. To the resulting calcined material in the form of granules, $La_2(CO_3)_3 \cdot 8H_2O$, $CoO_x$($CoO$+$Co_3O_4$), the iron oxide ($\alpha$-$Fe_2O_3$) and $SiO_2$ (0.4% by weight), which were the same as those used as the raw materials, $CaCO_3$ (1.25% by weight), and calcium gluconate (0.6% by weight) were added in such a manner that the composition after the addition became the following formula:

$$Sr_{1-x}La_xFe_{12-x}Co_xO_{19}$$

wherein x=y=0, 0.1, 0.2 or 0.3, followed by subjecting to the coarse pulverization using a small-sized vibration mill. The composition was then subjected to the wet pulverization in the same manner as in Example 1 for 40 hours, followed by sintering. Separately, a sample wherein no calcium gluconate was used but only water was used, and a sample wherein xylene was used as the solvent for the dispersing medium and oleic acid was used as the dispersant were prepared.

Figure 8:
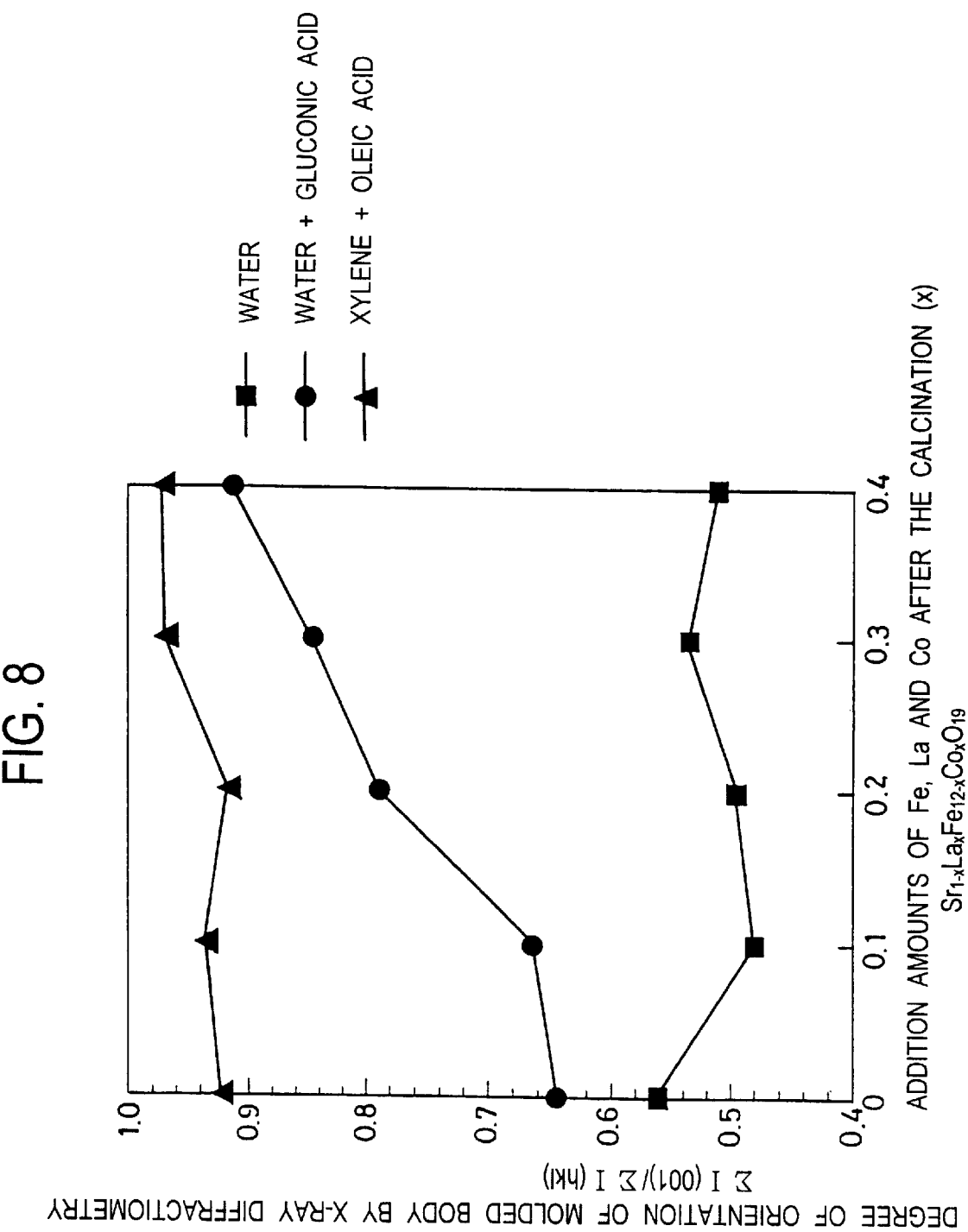
FIG. 8 is a graph showing degrees of orientation depending on the substituted amount of La and Co of the samples of the invention.
Figure 9:
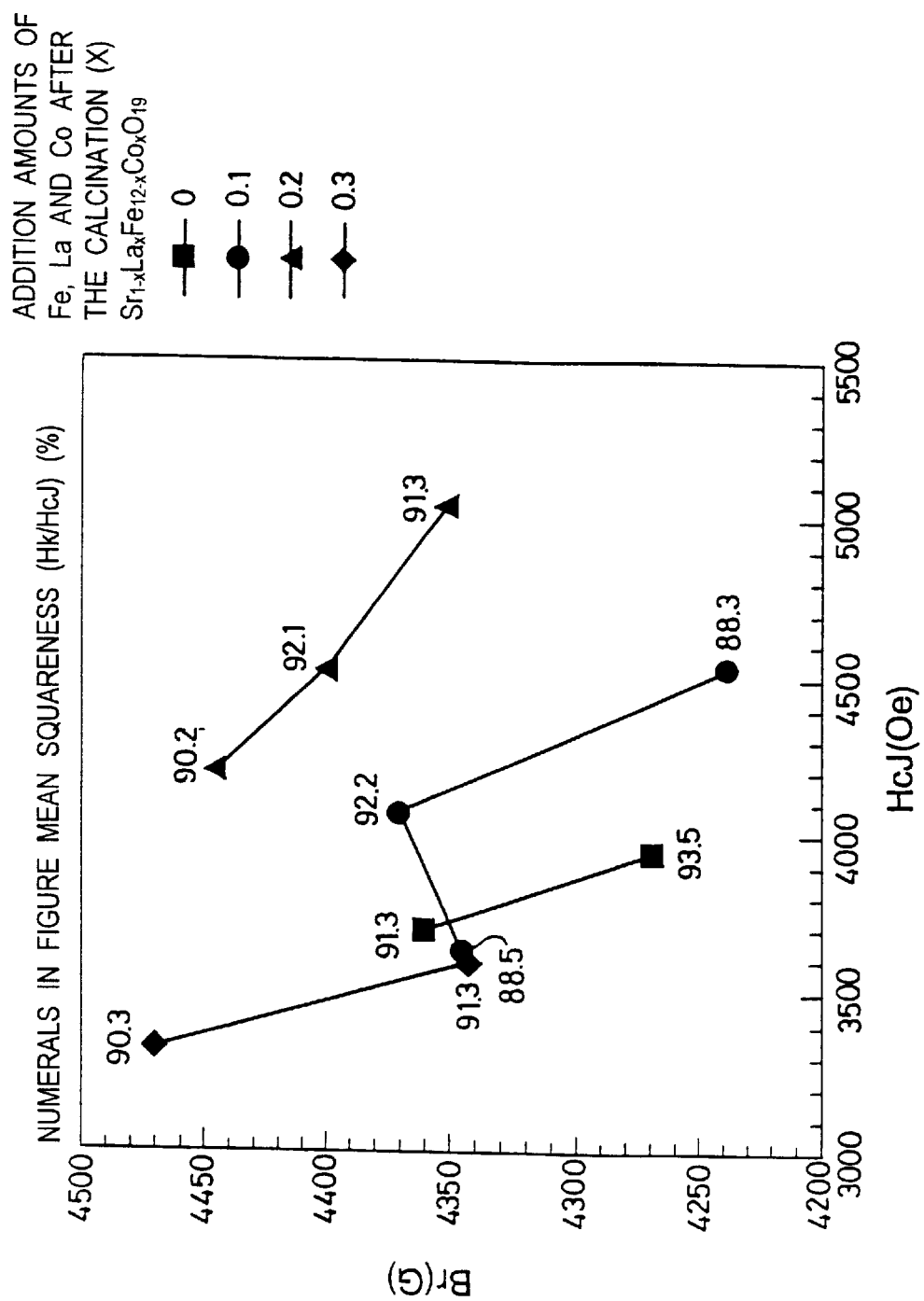
FIG. 9 is a graph showing HcJ—Br characteristics of the samples of the invention.

The degrees of orientation of the molded bodies depending on the addition amounts of La and Co for the sintered body samples are shown in FIG. 8, and the HcJ—Br characteristics thereof are shown in FIG. 9. The addition amounts of Fe, La and Co after the calcination were expressed by x, with the composition after the addition being represented by the following formula:

$$Sr_{1-x}La_xFe_{12-x}Co_xO_{19}$$

In the case where calcium gluconate was used as the aqueous 5 dispersant, the clear increase in degree of orientation was observed with the increase in the addition amount after the calcination, and in the case of x (substitution degree) of 0.4, it was closed to the value obtained when xylene was used as the non-aqueous solvent and oleic acid was used as the surface active agent. On the other hand, no improvement in degree of orientation was observed when no gluconic acid was added to water. With respect to the characteristics of the sintered bodies, in many cases, Hk/HcJ>90%, and it was the maximum that x=0.2. When the addition amount became large (x>0.3), the moldability was lowered.

Figure 10:
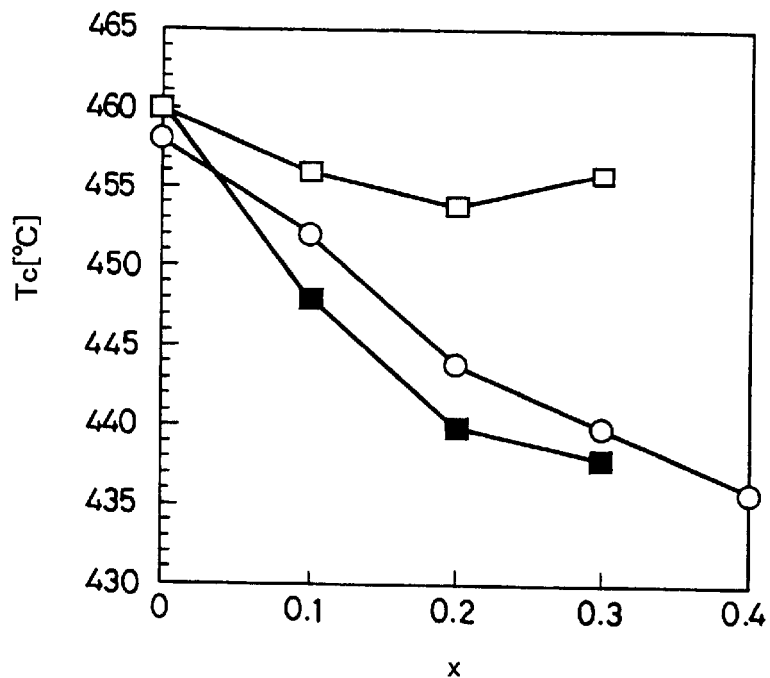
FIG. 10 is a graph showing the x dependency of the Curie point Tc of the samples of the present invention as prepared in an aqueous system with the additive compounds added after calcination, and that of the comparative samples as prepared in an organic solvent system with the additive compounds added before calcination.

FIG. 10 shows the x dependency of Tc of the sintered samples produced herein, while being compared with that of the sintered samples as produced in an organic solvent system with the additive compounds added before calcination (according to the process of Example 5). Of the two Curie temperatures, the lower Tc (Tc1) lowered with the increase in x, while the higher Tc (Tc2) did not vary so much. This will indicate that Tc1 is the Tc of the Sr ferrite part having a higher degree of substitution with La and Co (at least having a higher degree of substitution with La).

Figure 11:
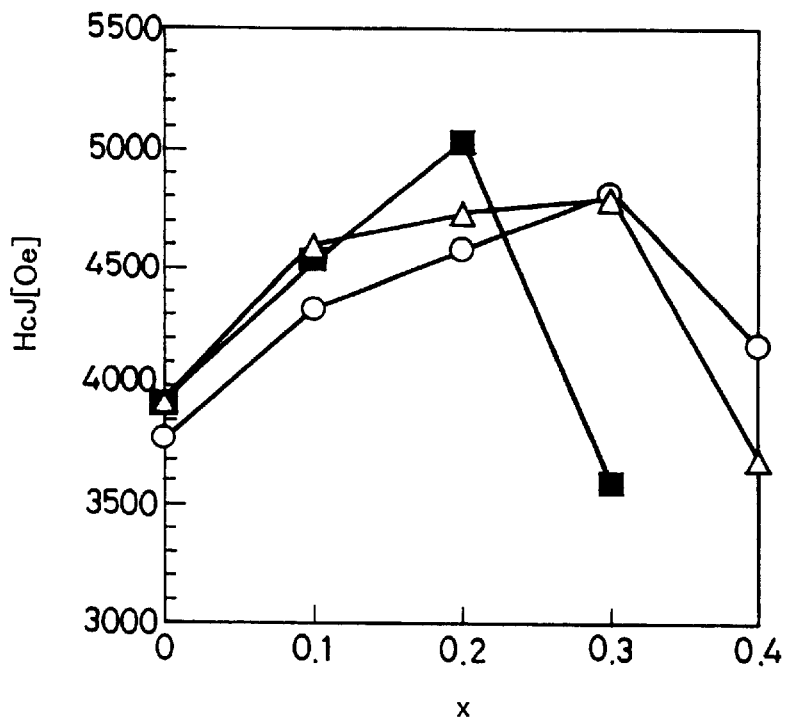
FIG. 11 is a graph showing the x dependency of HcJ of the samples of the present invention as prepared in an aqueous system with the additive compounds added after calcination, and that of the comparative samples as prepared in an organic solvent system with the additive compounds added before calcination.

FIG. 11 shows the x dependency of HcJ of the sintered samples produced herein, while being compared with that of the sintered samples as produced in an organic solvent system with the additive compounds added before calcination (according to the process of Example 5) and with that of the sintered samples as produced in an aqueous system with the additive compounds added before calcination (according to the process of Comparative Example 1). As in FIG. 11, it is known that the sample with x=0.3 as produced with the additive compounds added before calcination had a maximum value of HcJ, while the sample with x=0.2 as produced with the additive compounds added after calcination had a maximum value of HcJ. From this, it is understood that the samples as produced with the additive compounds added after calcination still have good magnetic characteristics even when the amount of the expensive additive of Co is reduced to about $\frac{2}{3}$ of that added to the samples as produced with the additive compounds added before calcination.

Figure 12:
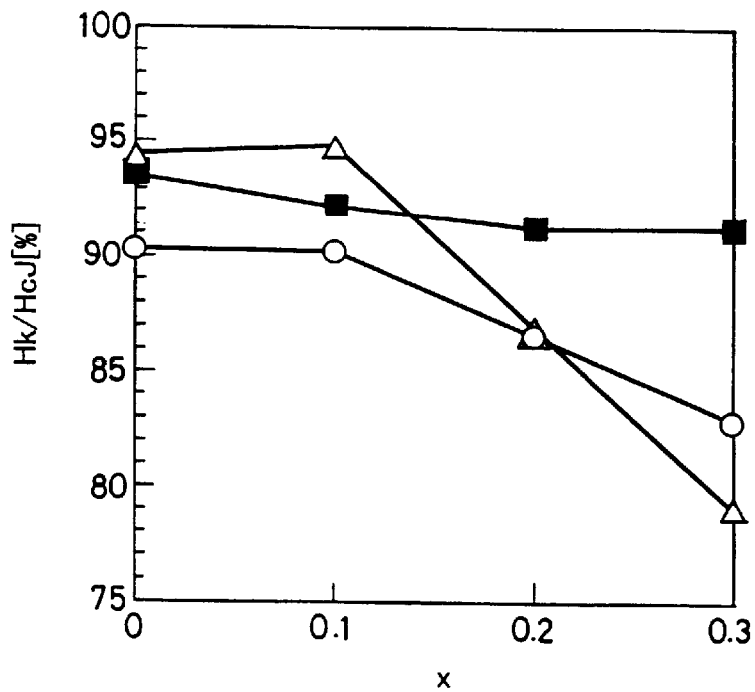
FIG. 12 is a graph showing the x dependency of the squareness (Hk/HcJ) of the samples of the present invention as prepared in an aqueous system with the additive compounds added after calcination, and that of the comparative samples as prepared in an organic solvent system with the additive compounds added before calcination.
Figure 13:
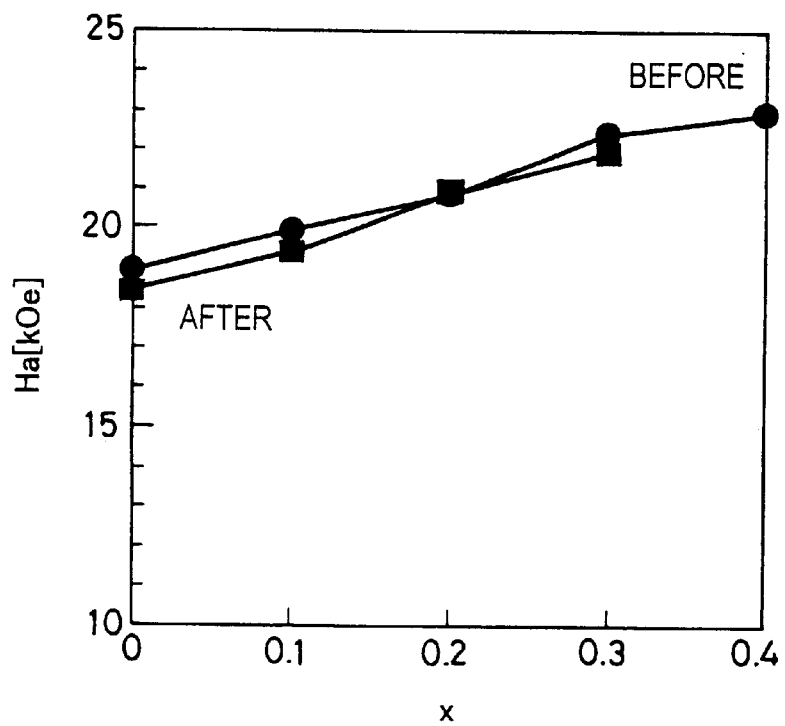
FIG. 13 is a graph showing the anisotropic magnetic field ($H_A$) of the samples of the present invention as prepared in an aqueous system with the additive compounds added after calcination, and that of the comparative samples as prepared in an organic solvent system with the additive compounds added before calcination.

FIG. 12 shows the x dependency of the squareness (Hk/HcJ) of the sintered samples produced herein, while being compared with that of the sintered samples as produced in an organic solvent system with the additive compounds added before calcination (according to the process of Example 5) and with that of the sintered samples as produced in an aqueous system with the additive compounds added before calcination (according to the process of Comparative Example 1). As in FIG. 12, it is known that the samples as produced with the additive compounds added after calcination still have a high squareness (Hk/HcJ) even though they have a high degree of substitution x. FIG. 13 shows the anisotropic magnetic field ($H_A$) of the samples produced herein, while being compared with that of the samples as produced in an organic solvent system with the additive compounds added before calcination. For this, the anisotropic magnetic field was obtained on the basis of the anisotropy constant ($K_1$) as measured with a torque meter. As in FIG. 13, it is obvious that $H_A$ of the samples produced herein was nearly the same as that of the samples produced in an organic solvent system with the additive compounds added before calcination.

EXAMPLE 3

A comparison was made for the addition of Fe before calcination, and La and Co after calcination, and was also made for the calcination temperatures.

Calcined grains were prepared in the same manner as in Example 1, except that the raw materials were weighed to give a ratio of Sr:Fe=0.8:11.8=1:14.75, and calcined at different temperatures of 1,150° C., 1,200° C., 1,250° C. and 1,300° C. Analyzing the samples of the calcined grains through X-ray diffractometry verified the existence of an M phase and a hematite phase ($\alpha$-$Fe_2O_3$) in those samples. In this, as of the Sr M phase in the calcined powder was calculated on the presumption that the excess Fe over the stoichiometric composition (Sr:Fe=1:12) was all converted into the $\alpha$-$Fe_2O_3$ phase while the remaining Fe was into the Sr M phase. As a result, it was substantially equal to the as value of the Sr M calcined material that had been calcined at the same calcination temperature.

To the resulting calcined material in the form of granules, $La_2(CO_3)_3 \cdot 8H_2O$, $CoO_x(CoO+CO_3O_4)+SiO_2$ (0.4% by weight), $CaCO_3$ (1.25% by weight), and calcium gluconate (0.6% by weight) were added in such a manner that the composition was represented by the following formula:

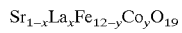
$Sr_{1-x}La_xFe_{12-y}Co_yO_{19}$ wherein x=y=0.2, followed by subjecting to coarse pulverization using a small-sized vibration mill. To 210 g the resulting coarse powder, added was 400 cc of water (in this, however, $Fe_2O_3$ was not added thereto), and the resulting mixture was wet-pulverized for 40 hours in the same manner as in Example 1 into fine grains. The grains were wet-molded in a magnetic field, and then sintered.

Figure 14:
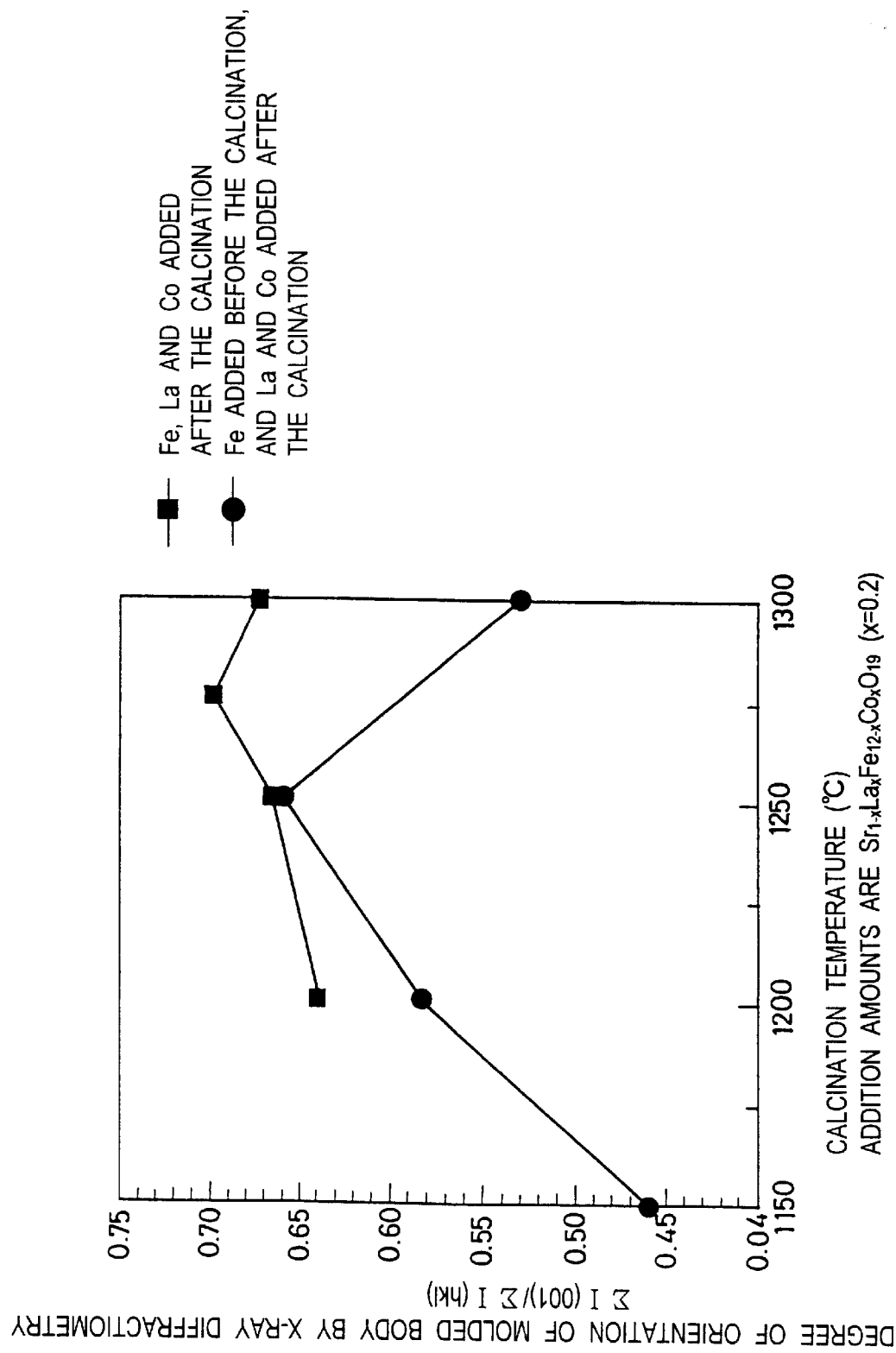
FIG. 14 is a graph showing degrees of orientation of the samples of the present invention.
Figure 15:
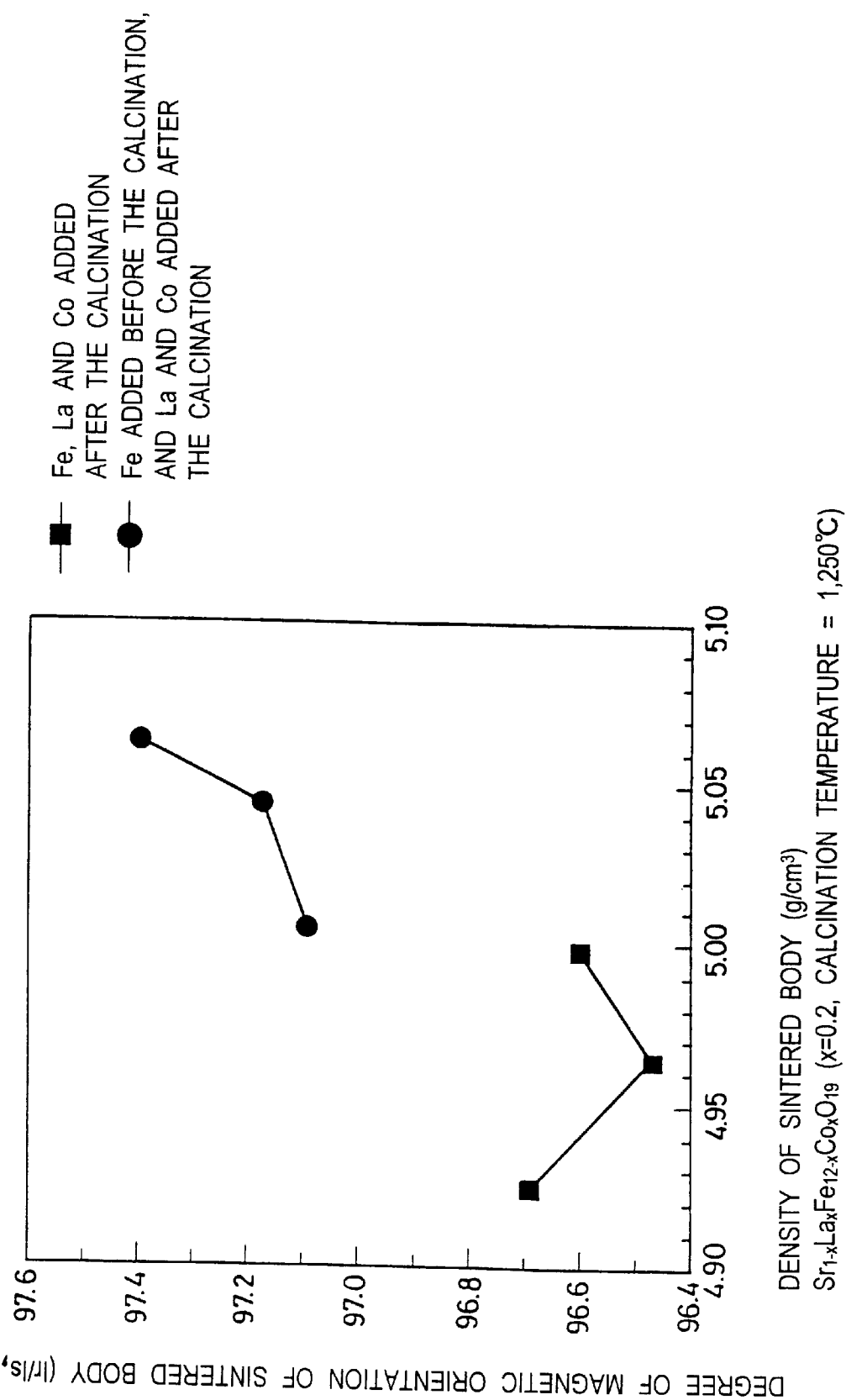
FIG. 15 is a graph showing degrees of magnetic orientation of depending on the density at a calcination temperature of 1,250° C.
Figure 16:
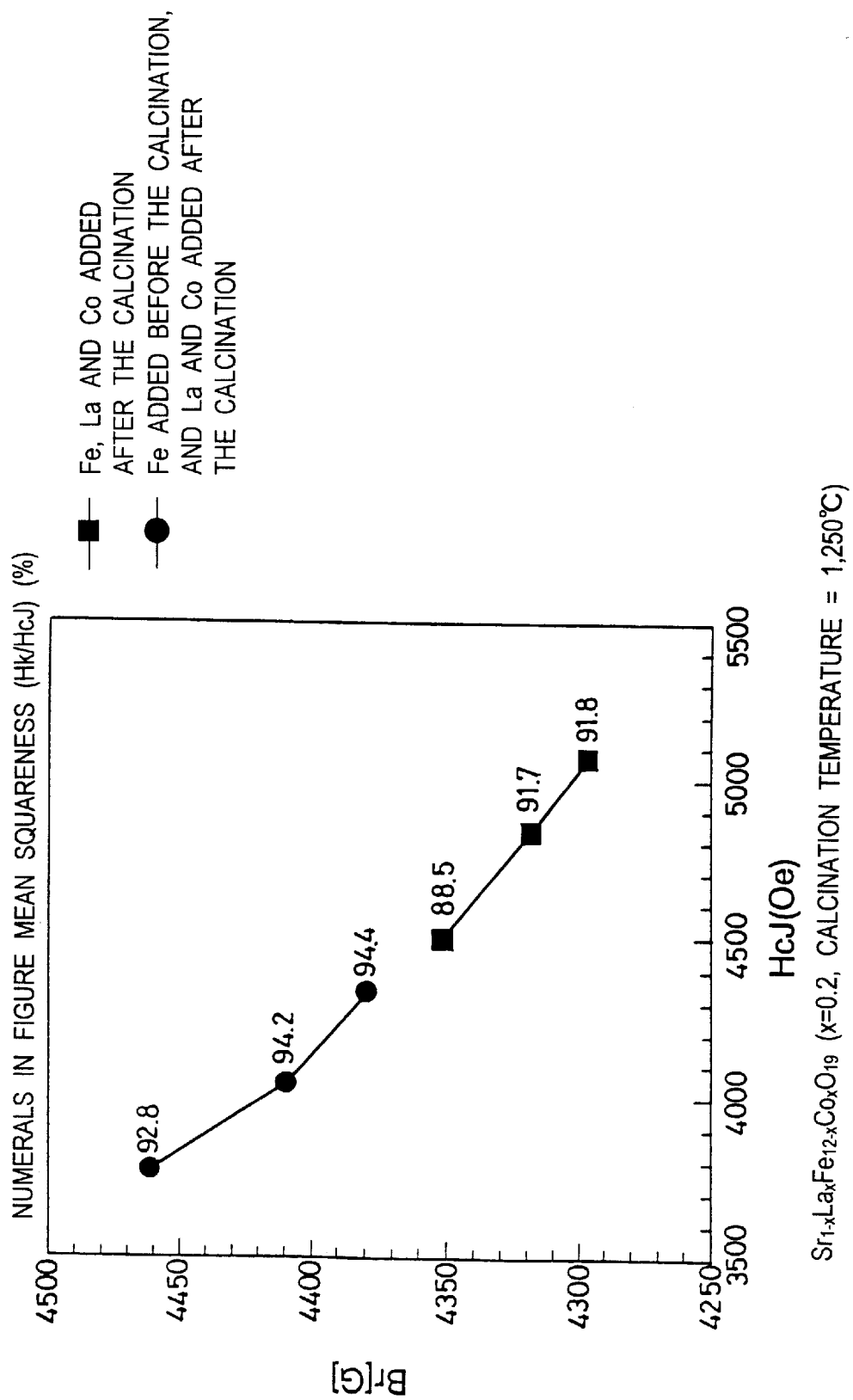
FIG. 16 is a graph showing HcJ—Br and Hk/HcJ at a calcination temperature of 1,250° C.

The resulting molded body was analyzed through X-ray diffractometry for the degree of orientation. The results obtained are shown in FIG. 14. It is clear from FIG. 14 that the degree of orientation of the molded body from the grains having been calcined at 1,250° C. was high, which was equivalent to the sample obtained by the process where all the additives were added after the calcination. FIG. 15 shows the relationship between the sintered density and the degrees of magnetic orientation Ir/Is) at a calcination temperature of 1,250° C. Although the degrees of orientation of the molded bodies were the same, the sample obtained by the process where only La and Co were added after the calcination had the higher density and the higher degree of orientation. FIG. 16 shows HcJ—Br and Hk/HcJ at a calcination temperature of 1,250° C. In the sample obtained by the process where only La and Co were added after the calcination, HcJ was lowered but Br was high due to the high density and degree of orientation, which was in the same level of characteristics as the sample of Example 2.

According to the production process employed herein, the sintered samples had good magnetic characteristics even when a large amount of fine $Fe_2O_3$ grains were not added to the calcined powder. In addition, as having relatively better moldability, calcined powder is further advantageous in that it is easy to mold. The Curie temperature of the samples was measured, and it was confirmed that the samples all had two or more Curie temperatures.

EXAMPLE 4

A comparison was made for the addition of Fe and La before calcination, and only Co after calcination.

Calcined grains were prepared in the same manner as in Example 1, except that the raw materials were weighed to give a ratio of Sr:La:Fe=0.8:0.2:11.8, and calcined at different temperatures of 1,200° C. and 1,250° C. Analyzing the samples of the calcined grains through X-ray diffractometry verified the existence of an M phase and a hematite phase ($\alpha$-$Fe_2O_3$) in those samples, but no orthoferrite ($FeLaO_3$) was found.

To the resulting calcined material in the form of granules, $CoO_x(CoO+CO_3O_4)+SiO_2$ (0.4% by weight), $CaCO_3$ (1.25% by weight), and calcium gluconate (0.6% by weight) were added in such a manner that the composition was represented by the following formula:

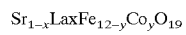
$Sr_{1-x}La_xFe_{12-y}Co_yO_{19}$ wherein x=y=0.2, followed by subjecting to coarse pulverization using a small-sized vibration mill. The composition was then subjected to the wet pulverization in the same manner as in Example 1 for 40 hours, followed by sintering in the same manner as in Example 1.

HcJ—Br and Hk/HcJ are shown in Table 6.

TABLE 6

| HcJ (kOe) | 4πIs (kG) | Br (kG) | Ir/Is (%) | Hk/HcJ (%) | (BH)max (MGOe) | Sintered density (g/cm³) |
|---|---|---|---|---|---|---|
| 4.62 | 4.58 | 4.40 | 9.59 | 88.5 | 4.69 | 5.05 |

The characteristics were the substantially same as in Examples 2 and 3.

EXAMPLE 5

A comparison was made for the addition of additive compounds in a solvent-type dispersion medium after calcination.

In the same manner as in Example 1, sintered bodies were produced by adding additive compounds to the same composition as in Example 1 ($SrFe_{12}O_{19}+SiO_2$: 0.2% by weight+$CaCO_3$: 0.15% by weight) after the calcination to give samples having a composition of:

$Sr_{1-x}La_xFe_{12-y}Co_yO_{19}$ wherein x=y=0.1, 0.2, 0.3 or 0.4. In this, however, oleic acid was used as the dispersant in place of calcium gluconate, and xylene was used as the dispersion medium in place of water.

On the other hand, sintered bodies were produced in the same manner as in Comparative Example 1 to have a composition of:

$$Sr_{1-x}La_xFe_{12-y}Co_yO_{19}$$

wherein x=y=0.1, 0.2, 0.3 or 0.4. In this, however, oleic acid was used as the dispersant in place of calcium gluconate, and xylene was used as the dispersion medium in place of water.

Figure 17:
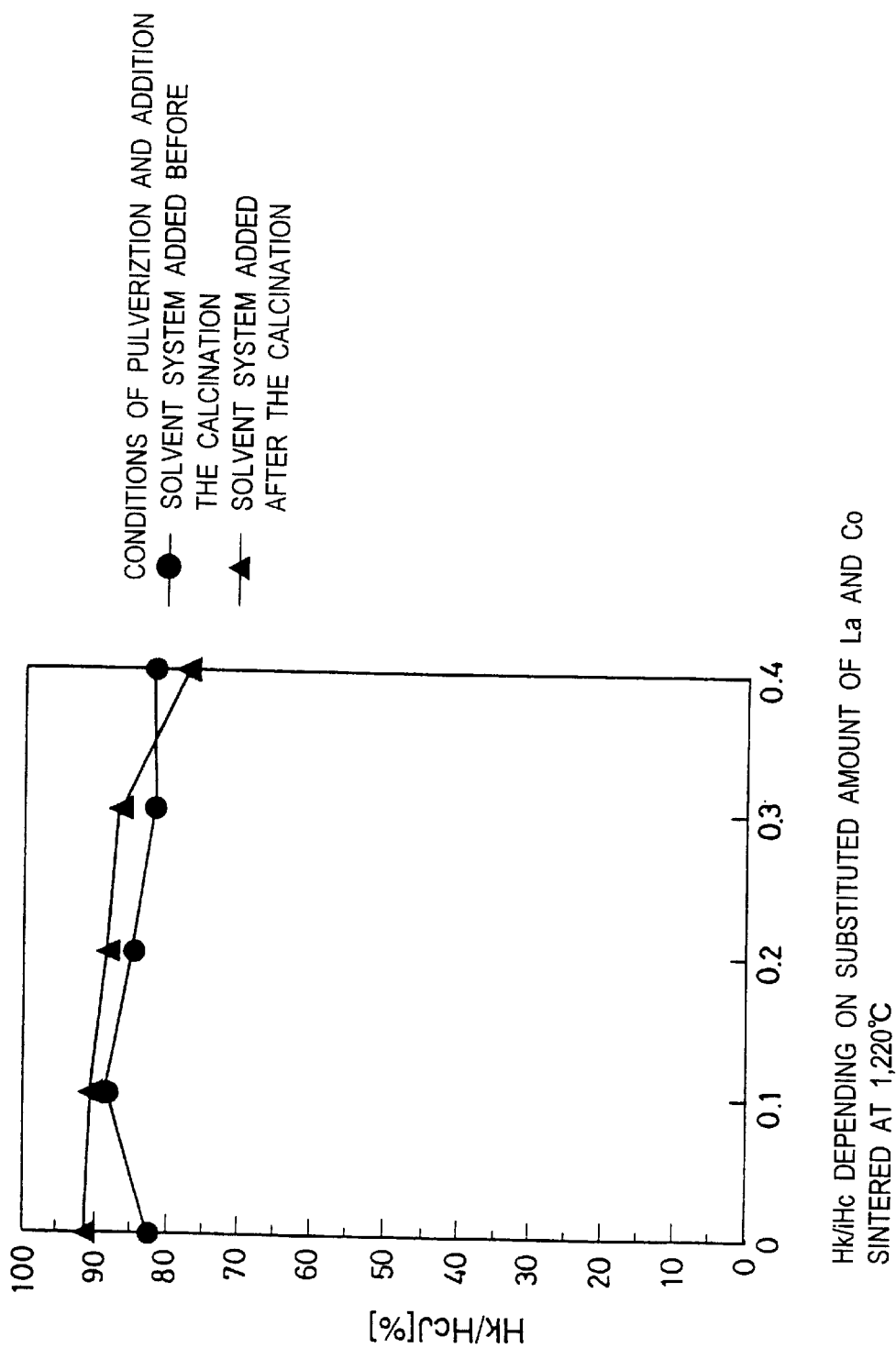
FIG. 17 is a graph showing squareness Hk/HcJ of the sintered body samples at 1,220° C. of the samples of the present invention.
Figure 18:
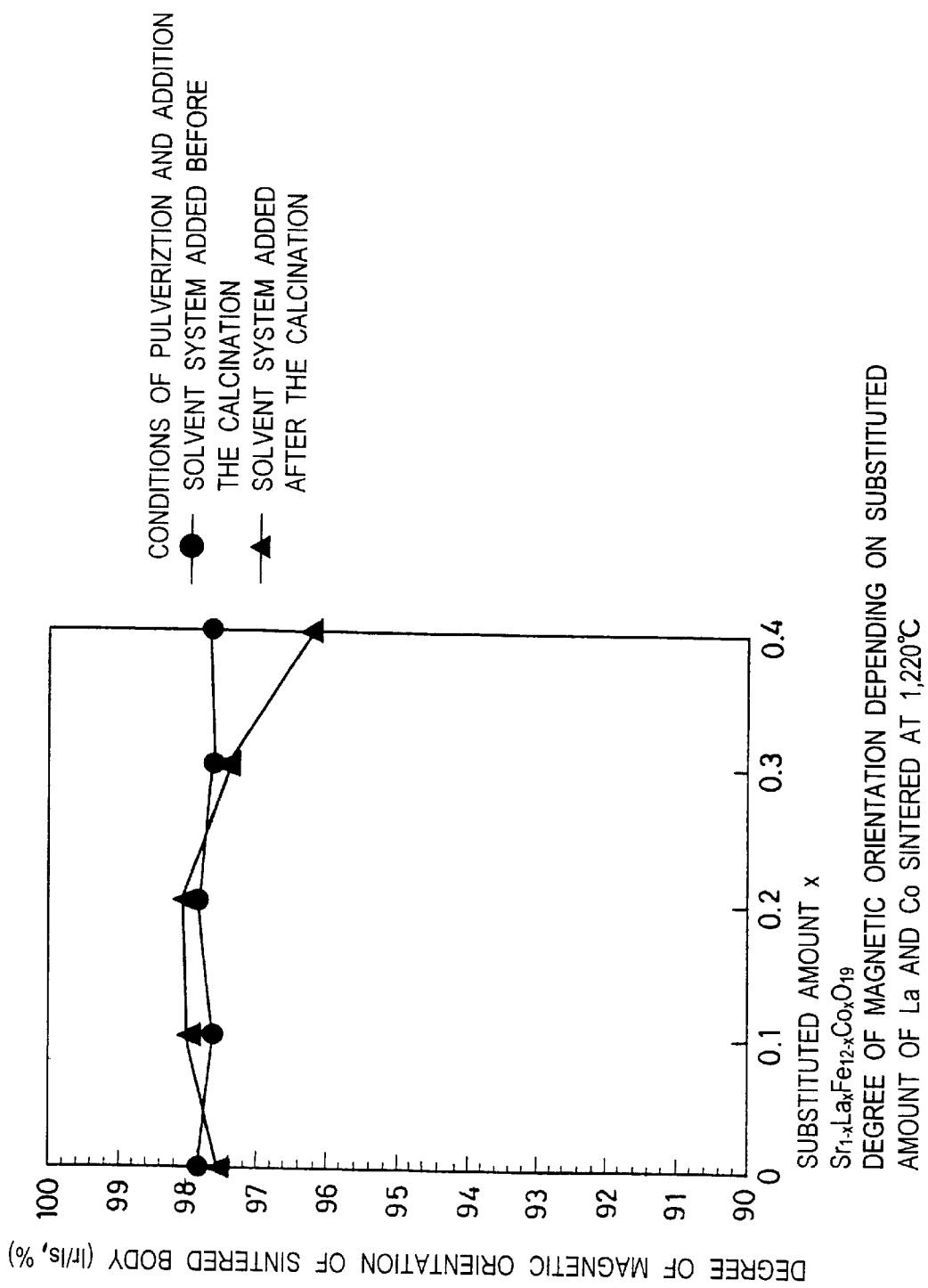
FIG. 18 is a graph showing degrees of magnetic orientation (Ir/Is) depending on the substituted amount of the samples of the present invention.

The squareness Hk/HcJ of the resulting sintered body samples obtained at 1,220° C. is shown in FIG. 17, and the degree of magnetic orientation depending on the addition amounts (Ir/Is) is shown in FIG. 18. The degrees of orientation of the samples were in the same level, but Hk/HcJ of the samples as produced with the additive compounds added after the calcination was higher than that of the samples as produced with the additive compounds added before the calcination.

EXAMPLE 6

Investigation was made for the separate addition of La and Co.

As raw materials, the following materials were used.
$Fe_2O_3$ powder (primary grain size: 0.3 μm) 1,000.0 g
$SrCO_3$ powder (primary grain size: 2 μm) 161.2 g These raw materials were pulverized in a wet attritor, followed by drying and rectification of granules, and sintered in the air at 1,250° C. for 3 hours, to obtain a calcined material in the form of granules.

To the resulting calcined material, $SiO_2$=0.6% by weight, $CaCO_3$=1.4% by weight, lanthanum carbonate ($La_2(CO_3)_3 \cdot 8H_2O$), cobalt oxide (CoO), and calcium gluconate (0.9% by weight) were added on the pulverization by a dry vibration mill. At this time, the La/Co ration was changed by changing the addition amount of La Iron oxide ($Fe_2O_3$) was added on the pulverization by a ball mill. Separately, as the calcined material (referred to as mother material in the Table), those of the addition amounts of lanthanum carbonate ($La_2(CO_3)_3 \cdot 8H_2O$) and cobalt oxide (CoO) before the calcination x=0 or 0.1 were prepared. The compositions of the samples and the results of analysis of the pulverized materials are shown in Table 7.

Figure 19:
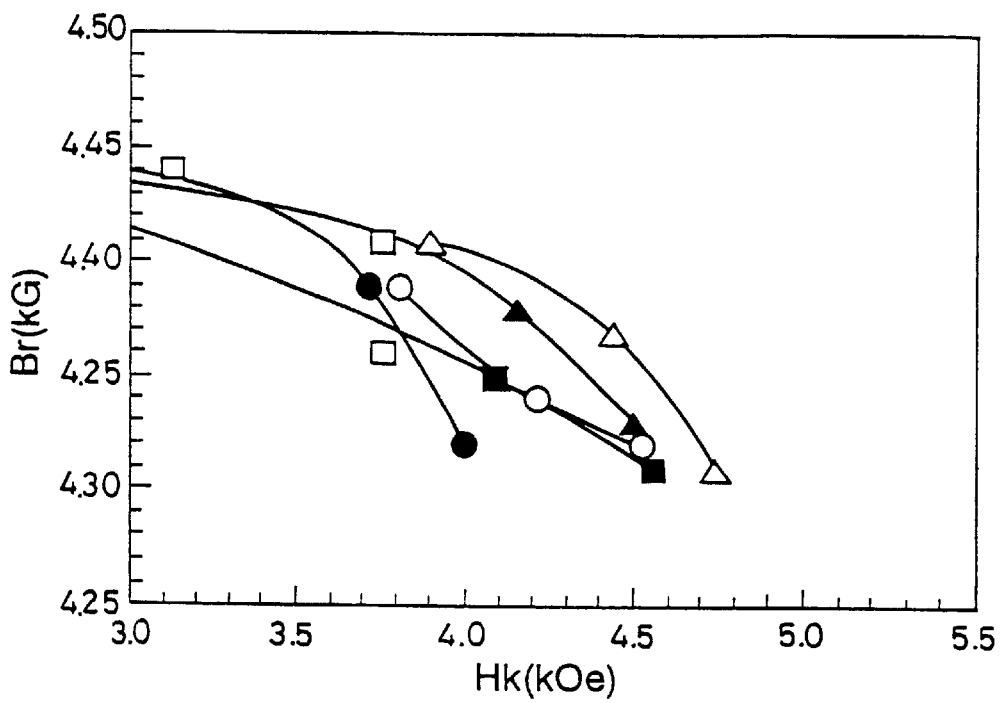
FIGS. 19A and 19B are graphs showing magnetic characteristics of the samples sintered at 1,200° C., 1,220° C. and 1,240° C.
Figure 19:
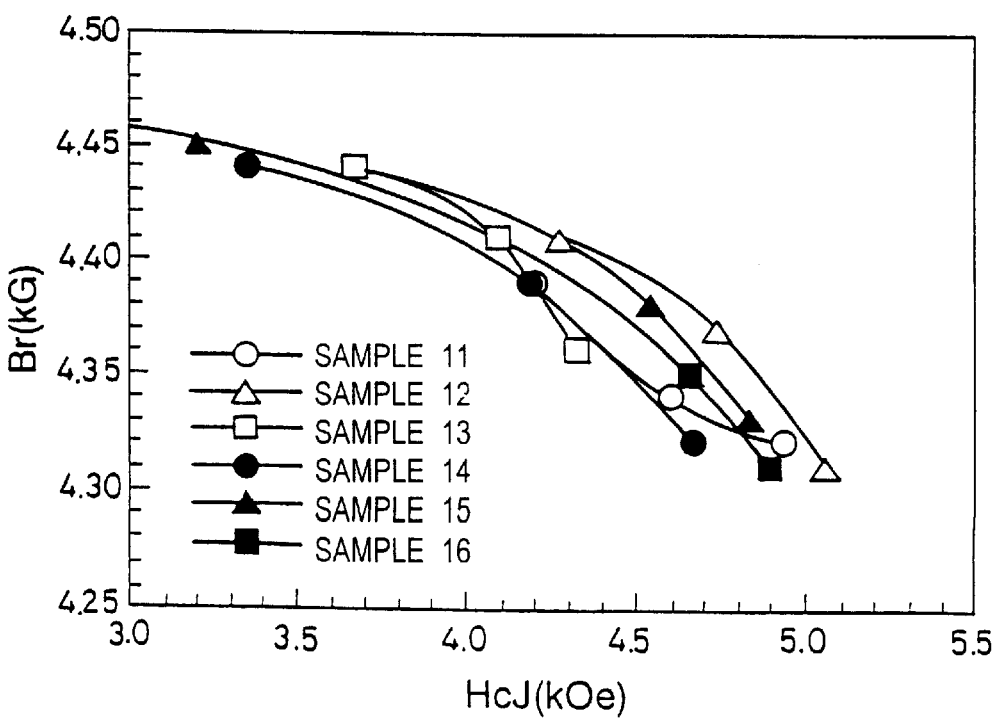

The resulting samples were sintered at 1,200° C., 1,220° C. and 1,240° C., and measured for magnetic characteristics. The results obtained are shown in FIGS. 19A and 19B. In all the samples, a relatively high HcJ and Hk values were obtained in the case of the La-rich composition (La/Co=1.14 to 1.23). As a comparison was made at the optimum point of La/Co, in the case of the addition of x=0.1 after the calcination to the mother material of x=0.1, Hk had a tendency of deteriorated, and in the case of the addition of x=0.2 after the calcination to the mother material of x=0, high sintered magnetic characteristics were obtained. It has been known that the addition of La and Co on pulverization (after the calcination) provides a higher Hk than the case of the addition to the raw material (before the calcination). In this example, the intermediate behavior was observed between these two cases, and no characteristic result was obtained.

While the ferrites containing Sr have been considered in the foregoing examples, it has been confirmed that the equivalent results have been obtained for ferrites containing Ca or Ba.

The shape of the samples of the invention obtained in the foregoing examples was changed from the cylindrical form to a shape of a field magnet of a C type motor, to produce a sintered magnet having a shape of a C type motor. The resulting core materials were installed in a motor to replace the sintered magnet of the conventional material. The motor was operated at the rated conditions, and thus good characteristics were exhibited. The torque of the motor was observed, and thus the torque was increased in comparison to the motor using the conventional core material. The same results were obtained by using a bonded magnet.

EXAMPLE 7

Investigation was made for the HcJ temperature characteristics of samples as prepared with additive compounds added after calcination.

Samples of the sintered bodies as prepared in Example 1 and Comparative Example 1 were measured for the coercive force (HcJ) temperature characteristics. The data of HcJ as measured at temperatures falling between −100° C. and +100° C. gave a correlation coefficient of 99.9% or more, to which was applicable least square linear approximation. Based on this, the temperature characteristics of HcJ were calculated, and the results obtained are shown in Table 8 below. From these, it is known that the LaCo-containing ferrite samples having been produced with additive compounds added after calcination and having two Tc points have good HcJ temperature characteristics which are equal to or better than those of the samples having been produced with additive compounds added before calcination.

TABLE 7

| Sample No. | La/Co addition amount | | | Analytical result | | | |
| | Mother material (x) | Addition after the calcination (x) | La/Co | $La_2O_3$ (mol %) | CoO (mol %) | (Fe + Co)/(Sr + La) (molar ratio) | La/Co (molar ratio) |
| --- | --- | --- | --- | --- | --- | --- | --- |
| 11 | 0 | 0.2 | 1.1 | 1.37 | 2.55 | 12.21 | 1.07 |
| 12 | 0 | 0.2 | 1.3 | 1.55 | 2.53 | 12.02 | 1.22 |
| 13 | 0 | 0.2 | 1.5 | 1.76 | 2.48 | 11.80 | 1.42 |
| 14 | 0.1 | 0.1 | 1.1 | 1.42 | 2.62 | 11.88 | 1.08 |
| 15 | 0.1 | 0.1 | 1.3 | 1.38 | 2.43 | 12.20 | 1.14 |
| 16 | 0.1 | 0.1 | 1.5 | 1.47 | 2.38 | 12.25 | 1.23 |

TABLE 8

| Sample No. | HcJ (kOe): 25° C. | ΔHcJ/ΔT (Oe/° C.) | ΔHcJ/HcJ/ΔT (%/° C.) |
| --- | --- | --- | --- |
| 1 | 4.47 | 6.9 | 0.153 |
| 2 | 4.54 | 7.4 | 0.163 |
| 3* | 4.62 | 8.0 | 0.172 |

*Comparative Example

EXAMPLE 8

Investigation was made for addition of Pr after calcination.

Sintered magnets were produced in the same manner as in Example 2 except that $Pr_2(CO_3)_3 \cdot 0.5H_2O$ was used in place of $La_2(CO_3)_3 \cdot 8H_2O$, and evaluated for the magnetic characteristics. FIG. 20 shows the x dependency of Curie points Tc of the samples, while being compared with that of the sintered magnet samples as prepared with the additive compounds added in an organic solvent system before calcination (according to the process of Example 5), in which x– indicates the degree of additive substitution. Of the two Curie temperatures Tc, the lower Tc (Tc1) lowered with the increase in the degree of additive substitution x, while the higher Tc (Tc2) did not vary so much. This will indicate that Tc1 is the Tc of the Sr ferrite part having a higher degree of substitution with Pr and Co (at least having a higher degree of substitution with Pr).

Figure 21:
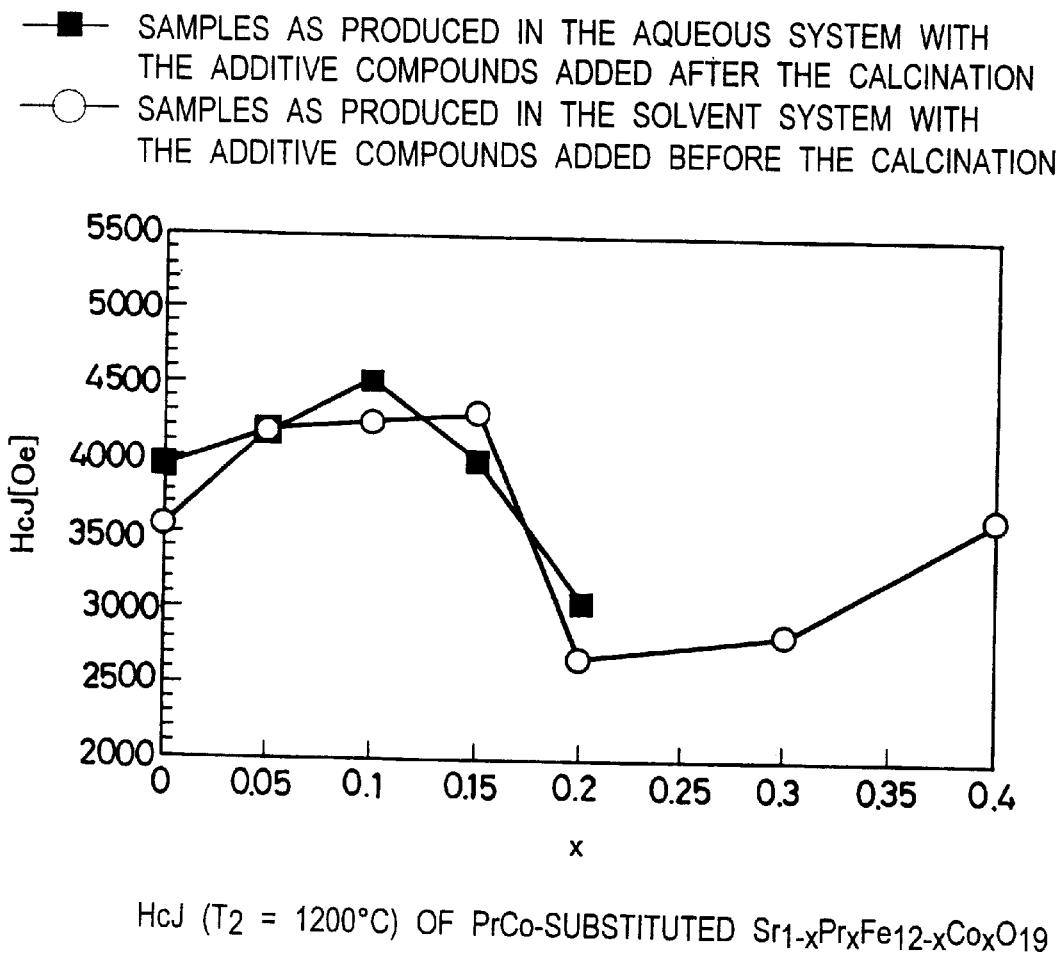
FIG. 21 is a graph showing the x dependency of HcJ of the samples of the present invention as prepared in an organic solvent system with the additive compounds added after calcination, and that of the comparative samples as prepared in an aqueous system with the additive compounds added before calcination.

FIG. 21 shows the x dependency of HcJ of the wintered samples produced herein, while being compared with that of the sintered samples as produced in an organic solvent system with the additive compounds added before calcination (according to the process of Example 5). As in FIG. 21, the sample with x=0.1 as produced with the additive compounds added after calcination had a maximum value of HcJ, which is higher than HcJ of the sample with x=0.1 as produced in the organic solvent system with the additive compounds added before calcination.

As has been described hereinabove, both the saturation magnetization and the magnetic anisotropy of M type ferrites are increased in accordance with the present invention. According to the present invention, therefore, there are provided ferrite magnets having a high residual magnetic flux density and a high coercive force, which conventional M type ferrite magnets could not have, and having extremely excellent temperature characteristics of coercive force, and also a process for producing the ferrite magnets. In particular, the ferrite magnets of the present invention have excellent magnetic characteristics in that their coercive force lowers little even in a low temperature region, and in addition, they have excellent squareness in the demagnetization curve.

The present invention also provides ferrite magnets and a process for producing them, which are advantageous in that the ferrite magnets still have excellent characteristics even though having a reduced content of expensive Co.

The present invention further provides ferrite magnets and a process for producing them, which are advantageous in that the ferrite magnets as produced in an aqueous system have a high degree of orientation that is comparable to the degree of orientation of the ferrite magnets as produced in a solvent system.

The present invention further provides motors and magnetic recording media having excellent characteristics.

Having described the present invention, it will now be apparent to one of ordinary skill in the art that many changes and modifications may be made to the above-described embodiments without departing from the spirit and the scope of the present invention.

What is claimed:

1. A magnet powder, comprising a primary phase of a hexagonal ferrite containing A, Co and R, wherein A represents Sr, Ba or Ca, and R represents at least one element selected from the group consisting of rare earth elements, comprising Y, and Bi;

wherein said magnet powder has at least two different Curie temperatures, said two different Curie temperatures are present within a range of from 400 to 480° C., and an absolute value of a difference therebetween is 5° C. or more.

2. The magnet powder of claim 1, wherein R contains at least La.

3. The magnet powder of claim 1, wherein said hexagonal ferrite is a magnetoplumbite ferrite.

4. The magnet powder of claim 1, wherein said hexagonal ferrite comprises A', R, Fe, and M, wherein A' represents at least one element selected from the group consisting of Sr, Ba, Ca and Pb, provided that Sr or Ba are essentially included in A', R represents at least one element comprising rare earth elements, Y, or Bi;

M represents Co, or Co and Zn, and proportions of said elements with respect to the total amount of said metallic elements are from 1 to 13 atomic % for A', from 0.05 to 10 atomic % for R, from 80 to 95 atomic % for Fe, and from 0.1 to 5 atomic % for M.

5. The magnet powder of claim 1, wherein the proportion of Co in said M is 10 atomic % or more.

6. The magnet powder of claim 1, wherein said magnetic powder has a temperature coefficient (absolute value) of a coercive force at from −50 to 50° C. of 0.1%/° C. or less.

7. A bonded magnet, comprising the magnet powder of claim 1.

8. A motor, comprising the bonded magnet of claim 7.

9. A magnetic recording medium, comprising the magnet powder of claim 1.

10. A sintered magnet, comprising a primary phase of a hexagonal ferrite containing A, Co and R, where A represents Sr, Ba or Ca, and R represents at least one element comprising rare earth elements, Y, or Bi;

wherein said sintered magnet has at least two different Curie temperatures, said two different Curie temperatures are present within a range of from 400 to 480° C., and an absolute value of a different therebetween is 5° C. or more.

11. The sintered magnet of claim 10, wherein R contains at least La.

12. The sintered magnet of claim 10, wherein said hexagonal ferrite is a magnetoplumbite ferrite.

13. The sintered magnet of claim 10, wherein said hexagonal ferrite comprises A', R, Fe, and M, wherein A' represents at least one element selected from Sr, Ba, Ca and Pb, provided that Sr or Ba are essentially included in A', R represents at least one element comprising rare earth elements, Y, or Bi, and M represents Co, or Co and Zn, and proportions of said elements with respect to the total amount of said metallic elements are from 1 to 13 atomic % for A', from 0.05 to 10 atomic % for R, from 80 to 95 atomic % for Fe, and from 0.1 to 5 atomic % for M.

14. The sintered magnet of claim 10, wherein the proportion of Co in M is 10 atomic % or more.

15. The sintered magnet of claim 10, wherein said sintered magnet has a squareness Hk/HcJ of 90% or more.

16. The sintered magnet of claim 10, wherein said sintered magnet has a degree of orientation Ir/Is of 96% or more.

17. The sintered magnet of claim 10, wherein said sintered magnet has a ratio of a total X-ray diffraction intensity from c-plane ($\Sigma I(00L)$) to a total X-ray diffraction intensity from all planes ($\Sigma I(hkL)$) of 0.85 or more.

18. The sintered magnet of claim 10, wherein said sintered magnet has a temperature coefficient (absolute value) of a coercive force at from −50 to 50° C. of 0.25%/° C. or less.

19. A motor, comprising the sintered magnet of claim 10.

20. A magnetic recording medium, comprising a thin film magnetic layer comprising a primary phase of a hexagonal ferrite containing A, Co and R, where A represents Sr, Ba or Ca, and R represents at least one element comprising rare earth elements, Y, or Bi;

wherein said thin film magnetic layer has at least two different Curie temperatures, said two different Curie temperatures are present within a range of from 400 to 480° C., and an absolute value of a difference therebetween is 5° C. or more.

* * * * *